(12) United States Patent  
Akama et al.

(10) Patent No.: US 10,809,822 B2
(45) Date of Patent: Oct. 20, 2020

(54) TOUCH PEN ATTACHMENT, CONTROLLER SYSTEM AND GAME SYSTEM

(71) Applicant: NINTENDO CO., LTD., Kyoto (JP)

(72) Inventors: Tetsuya Akama, Kyoto (JP); Junichiro Miyatake, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 16/430,661

(22) Filed: Jun. 4, 2019

(65) Prior Publication Data

US 2020/0019258 A1 Jan. 16, 2020

(30) Foreign Application Priority Data

Jul. 11, 2018 (JP) .................. 2018-131476

(51) Int. Cl.
```
G09G 5/00       (2006.01)
G09G 5/08       (2006.01)
G06F 3/0354     (2013.01)
A63F 13/2145    (2014.01)
A63F 13/24      (2014.01)
G06F 3/041      (2006.01)
```
(52) U.S. Cl.
CPC ...... G06F 3/03545 (2013.01); A63F 13/2145 (2014.09); A63F 13/24 (2014.09); G06F 3/0416 (2013.01)

(58) Field of Classification Search
CPC .................................................. G06F 3/03545
See application file for complete search history.

(56) References Cited

U.S. PATENT DOCUMENTS

| 2005/0081302 A1 | 4/2005 | Elsener |
| 2009/0265860 A1 | 10/2009 | Barber et al. |
| 2010/0160041 A1 | 6/2010 | Grant et al. |
| 2012/0075208 A1 | 3/2012 | Tamiya et al. |

(Continued)

FOREIGN PATENT DOCUMENTS

| EP | 3 305 381 | 4/2018 |
| EP | 3 343 323 | 7/2018 |

(Continued)

OTHER PUBLICATIONS

Extended European Search Report issued in EP Application No. 19178134.3 dated Nov. 18, 2019 (9 pages).

*Primary Examiner* — Nan-Ying Yang
(74) *Attorney, Agent, or Firm* — Xsensus LLP

(57) ABSTRACT

An example touch pen attachment is attachable to a game controller including a controller-side slide portion. The touch pen attachment includes a housing, an attachment-side slide portion, a stopper portion, and a touch pen portion. The attachment-side slide portion is configured to slidably engage with the controller-side slide portion in a slide direction, wherein the attachment-side slide portion has a first side and a second side with respect to the slide direction, and the controller-side slide portion is insertable into the attachment-side slide portion from the first side. The stopper portion stops a slide movement, in an insertion direction, of the controller-side slide portion. The touch pen portion is on at least one of an end portion of the housing on the first side in the slide direction and another end portion thereof on the second side in the slide direction.

17 Claims, 29 Drawing Sheets

(56) References Cited

U.S. PATENT DOCUMENTS

2015/0156290 A1* 6/2015 Amit ..................... H04M 1/026
                                                    345/179
2015/0273325 A1* 10/2015 Falc ..................... G06F 1/1626
                                                    463/37

FOREIGN PATENT DOCUMENTS

JP  2012-069065  4/2012
KR  10-1776262   9/2017

* cited by examiner

TOUCH PEN ATTACHMENT, CONTROLLER SYSTEM AND GAME SYSTEM

CROSS REFERENCE TO RELATED APPLICATION

The disclosure of Japanese Patent Application No. 2018-131476, filed on Jul. 11, 2018, is herein incorporated by reference.

FIELD

The present technique relates to an attachment that can be attached to a game controller.

BACKGROUND AND SUMMARY

There are conventional game apparatuses capable of accommodating a touch pen.

With conventional apparatuses, however, there was room for improvement in expanding the functionality of a touch pen used in a game system.

Therefore, the present application discloses a touch pen attachment, a controller system and a game system, with which it is possible to expand the functionality of a touch pen.

(1)

An example touch pen attachment described herein is attachable to a game controller including a controller-side slide portion. The touch pen attachment comprises a housing, an attachment-side slide portion, a stopper portion, and a touch pen portion. The attachment-side slide portion is configured to slidably engage with the controller-side slide portion in a slide direction. The attachment-side slide portion has a first side and a second side with respect to the slide direction. The controller-side slide portion is insertable into the attachment-side slide portion from the first side. The stopper portion is on the second side of a center of the attachment-side slide portion. The stopper portion is configured to stop a slide movement, in an insertion direction, of the controller-side slide portion that has been inserted from the first side of the attachment-side slide portion. The touch pen portion is on at least one of an end portion of the housing on the first side in the slide direction and another end portion thereof on the second side in the slide direction.

With configuration (1) above, the touch pen and the game controller can be integrated together by attaching the touch pen attachment to the game controller. Then, a user can make an input using the game controller and can also make a touch input using the touch pen. Therefore, with configuration (1) above, it is possible to expand the functionality of the touch pen. Moreover, with configuration (1) above, since the touch pen attachment is attached to the game controller via a slide mechanism, the touch pen attachment can easily be removed from the game controller when the touch pen is not used, and it is therefore possible to improve the convenience of the game controller.

(2)

The touch pen portion may include a conductive pen point. The attachment-side slide portion may be conductive. The touch pen attachment may further include a conductive connecting portion that connects together the pen point and the attachment-side slide portion.

With configuration (2) above, the touch pen attachment can be used with a capacitive touch panel. Moreover, with configuration (2) above, by connecting the pen point and the attachment-side slide portion together, it is possible to increase the capacitance of the pen point while keeping the number of parts small.

(3)

The attachment-side slide portion may be made of a metal.

With configuration (3) above, it is possible with the attachment-side slide portion to increase the capacitance of the pen point, and it is also possible to improve the mechanical strength of a portion of the touch pen attachment to which the game controller is attached.

(4)

The touch pen portion may be on the end portion of the housing on the second side in the slide direction.

With configuration (4) above, when the touch pen attachment is used while attached to the game controller, the touch pen attachment is unlikely to come off the game controller. It is also possible to reduce the possibility that the touch pen portion comes into contact with the game controller when the touch pen attachment is attached to the game controller.

(5)

The touch pen portion may protrude from an end portion of the attachment-side slide portion on the second side in a direction from the first side toward the second side.

With configuration (5) above, it is possible to make it easier to make a touch input using the touch pen attachment.

(6)

An example controller system described herein comprises the game controller and the touch pen attachment described above.

(7)

An example game system described herein includes a game apparatus, a game controller capable of communicating with the game apparatus, and a touch pen attachment that can be attached to the game controller. The game apparatus includes a touch panel. The game controller may be similar to any of the game controllers of (1) to (5) above. The touch pen attachment may be similar to any of the touch pen attachments of (1) to (5) above.

(8)

The game apparatus may include an apparatus-side transmitting section that transmits a vibration instruction to the game controller based on an input made on the touch panel using the touch pen portion. The game controller may include a vibrator, a controller-side receiving section, and a vibration control section. The controller-side receiving section receives the vibration instruction. The vibration control section vibrates the vibrator in response to the vibration instruction received by the controller-side receiving section.

With configuration (8) above, in the game system, a user can recognize the detection of a touch input in an easy-to-understand manner.

(9)

The game controller may include an input section and a controller-side transmitting section. The controller-side transmitting section transmits, to the game apparatus, input information of an input that is made on the input section. The game apparatus may include an apparatus-side receiving section and a processor. The apparatus-side receiving section receives the input information. The processor executes an information process based on an input that is made on the touch panel using the touch pen portion and on the input information.

With configuration (9) above, a user can give a wider variety of instructions through touch inputs using the touch pen attachment, and it is therefore possible to improve the convenience of the touch input.

With the touch pen attachment, the controller system and the game system set forth above, it is possible to expand the functionality of the touch pen.

These and other objects, features, aspects and advantages will become more apparent from the following detailed description when taken in conjunction with the accompanying drawings.

DETAILED DESCRIPTION OF NON-LIMITING EXAMPLE EMBODIMENTS

[1. Outline]

Figure 1:
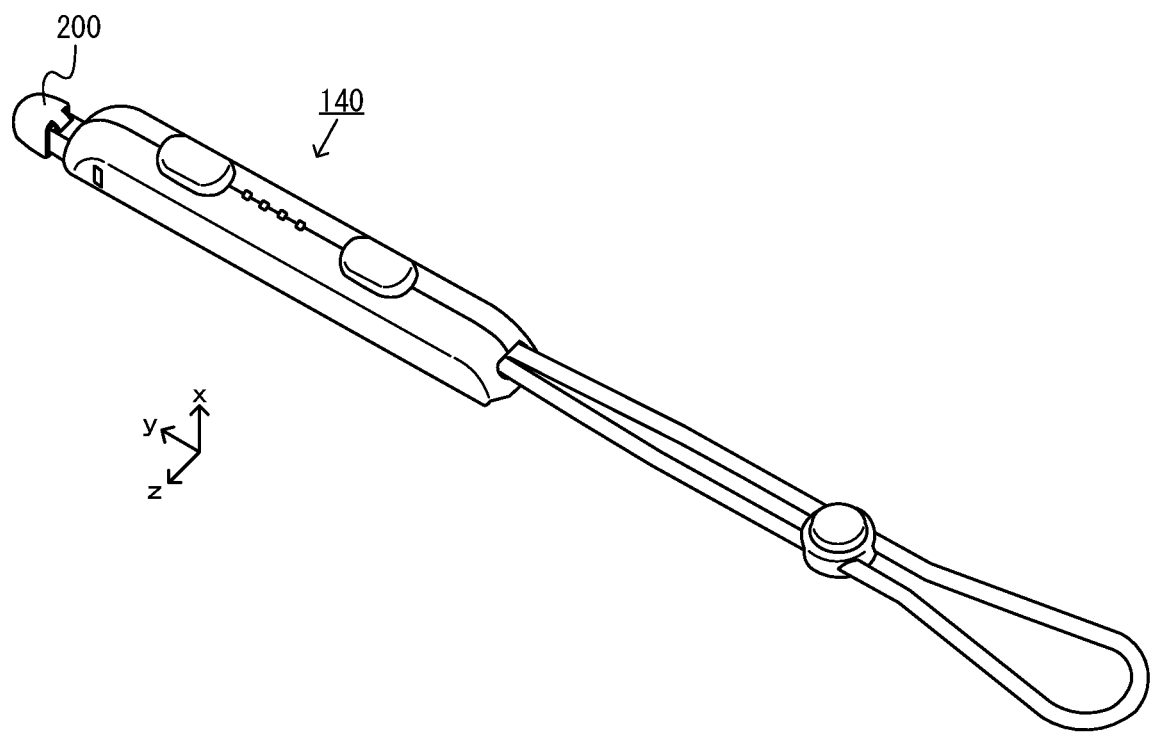
FIG. 1 shows the appearance of a non-limiting example touch pen attachment.
Figure 2:
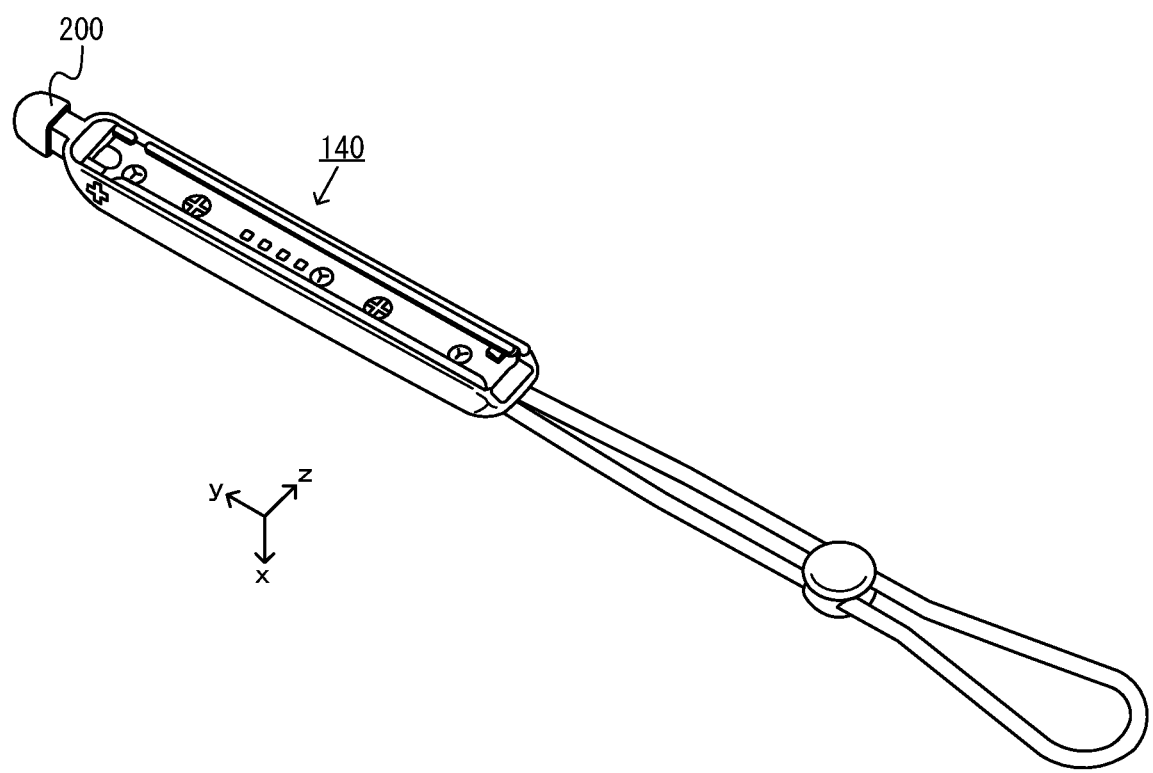
FIG. 2 shows the appearance of a non-limiting example touch pen attachment.

An attachment according to an example of the present embodiment, and a controller system and a game system including such an attachment will now be described. FIG. 1 and FIG. 2 each show an example appearance of a touch pen attachment according to the present embodiment. FIG. 1 is a perspective view showing the touch pen attachment as seen from one side (specifically, the x-axis positive direction side). FIG. 2 is a perspective view showing the touch pen attachment as seen from the other side (specifically, the x-axis negative direction side).

A touch pen attachment 140 shown in FIG. 1 is an example attachment that can be attached to a controller, and is an attachment that includes a touch pen portion 200. A user can attach a touch pen to a game controller to be described below by attaching the touch pen attachment 140 to the game controller. That is, in the present embodiment, with the touch pen attachment 140, it is possible to add a touch pen function to the game controller. Hereinafter, a touch pen attachment according to an exemplary embodiment and a controller system including the touch pen attachment will be outlined.

(1-1: Game System in which Touch Pen Attachment can be Used)

First, referring to FIG. 3 to FIG. 9, an example game system in which the touch pen attachment 140 can be used (i.e., a game system that includes a game controller to which the touch pen attachment 140 can be attached) will be described. An example of a game system 1 according to the exemplary embodiment includes a main body apparatus (an information processing apparatus; which functions as a game apparatus main body in the exemplary embodiment) 2, a left controller 3, and a right controller 4. Each of a left controller 3 and a right controller 4 is attachable to and detachable from the main body apparatus 2. That is, a game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment is described, and then, the control of the game system 1 according to the exemplary embodiment is described.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
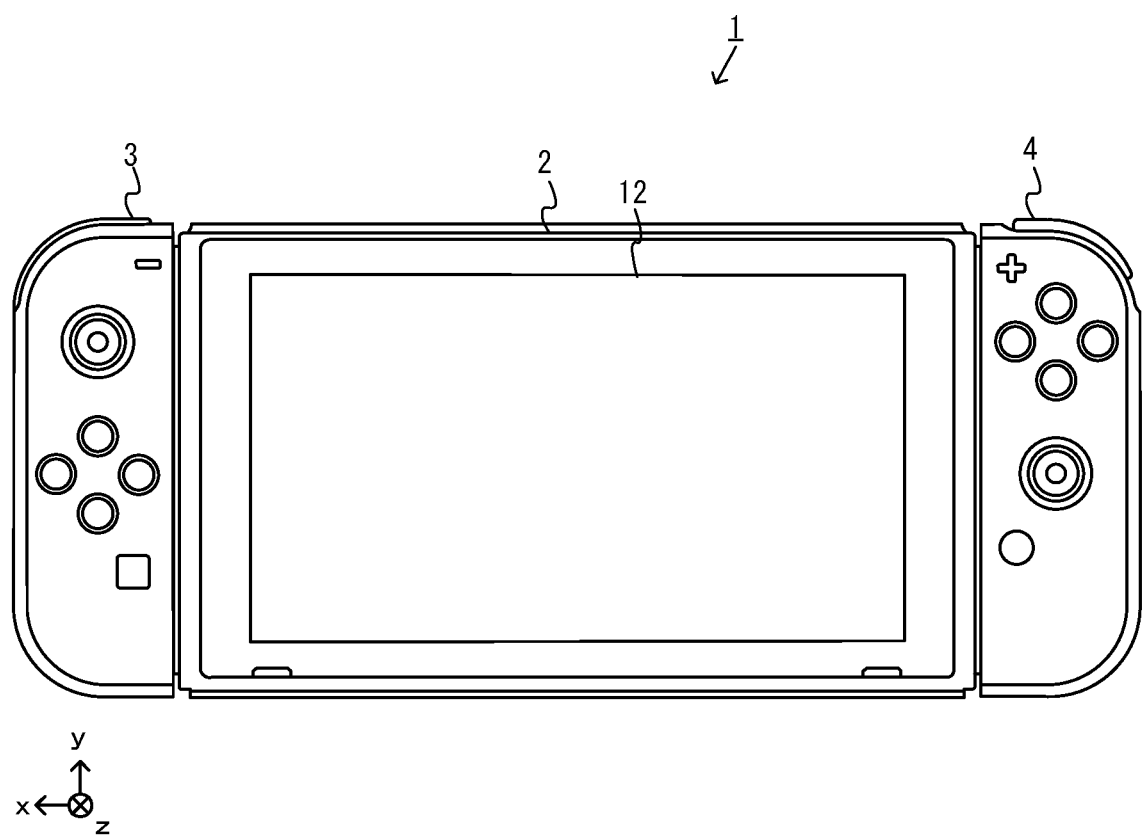
FIG. 3 shows an example of a state where a non-limiting left controller and a non-limiting right controller are attached to a non-limiting main body apparatus.

FIG. 3 is six orthogonal views showing an example of the main body apparatus 2. As shown in FIG. 3, a main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, a touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds output from the speakers 88 are output through the speaker holes 11a and 11b.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and output from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Figure 4:
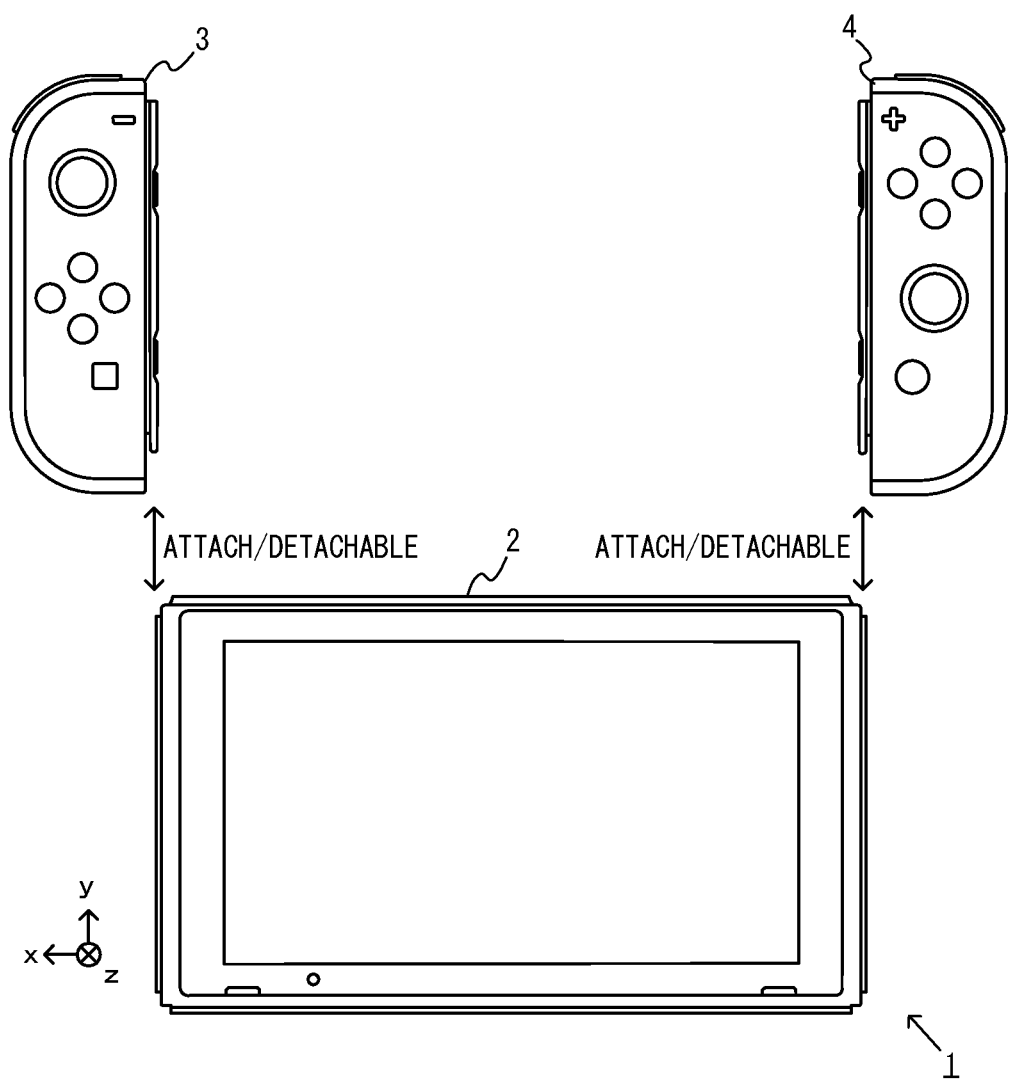
FIG. 4 shows an example of a state where a non-limiting left controller and a non-limiting right controller are detached from a non-limiting main body apparatus.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (i.e., a y-axis direction shown in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
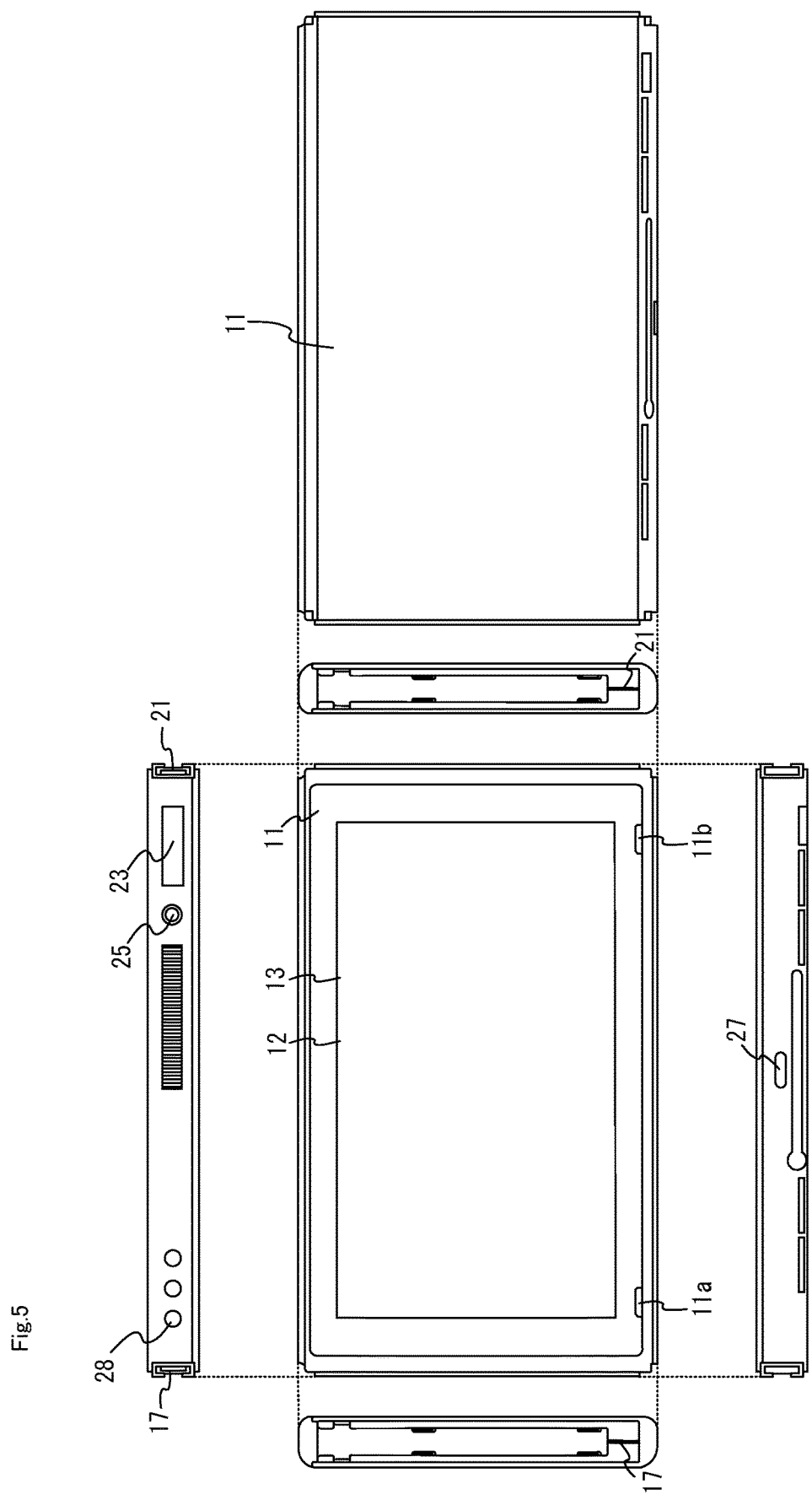
FIG. 5 is a six orthogonal views showing an example of a non-limiting main body apparatus.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
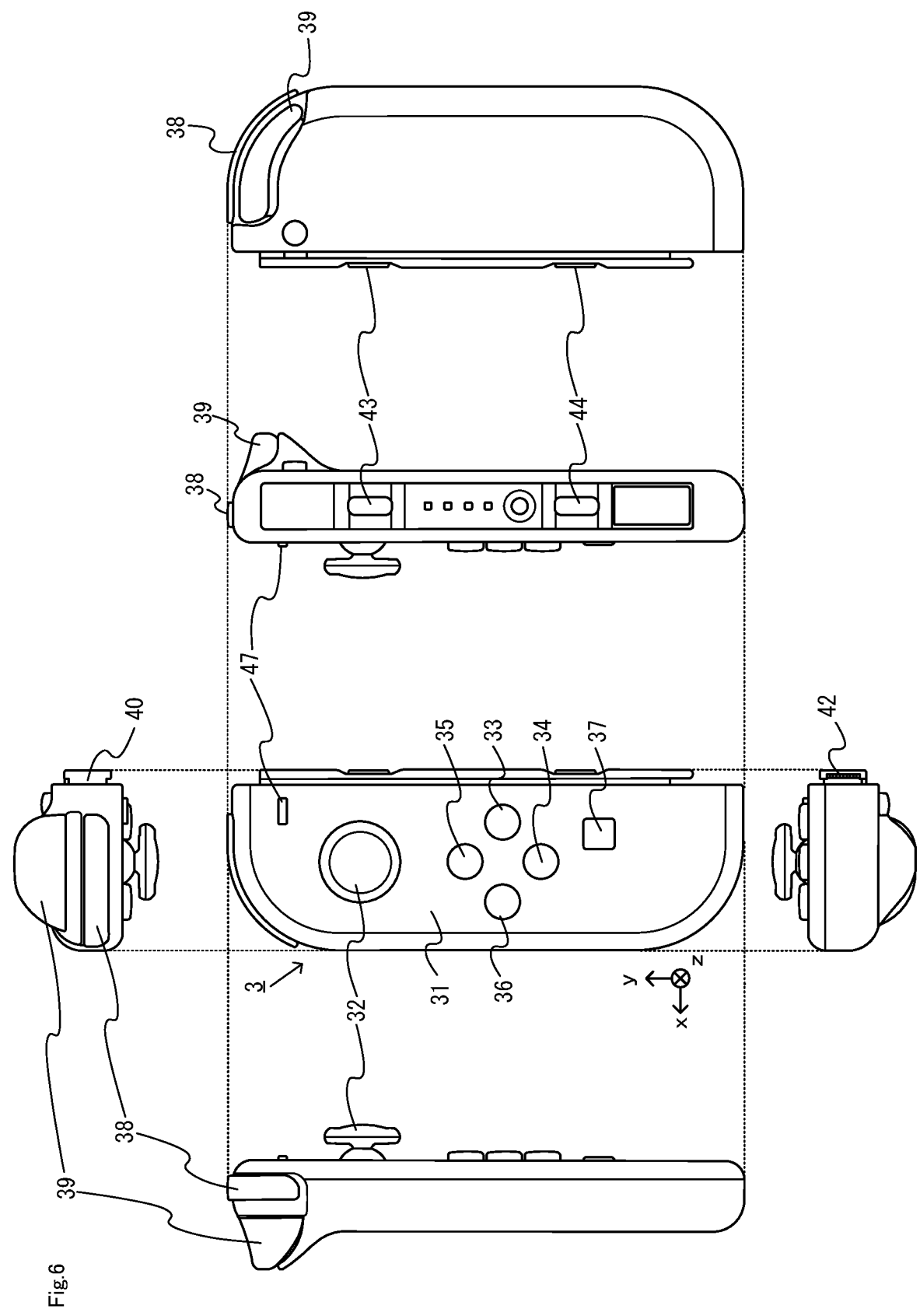
FIG. 6 is a six orthogonal views showing an example of a non-limiting left controller.

FIG. 6 is a block diagram showing an example of the internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, a processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, a controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 includes a touch panel controller 86, which is a circuit for controlling the touch panel 13. The touch panel controller 86 is connected between the touch panel 13 and the processor 81. Based on a signal from the touch panel 13, the touch panel controller 86 generates, for example, data indicating the position where a touch input is provided. Then, the touch panel controller 86 outputs the data to the processor 81.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

Further, the main body apparatus 2 includes an acceleration sensor 89. In the exemplary embodiment, the acceleration sensor 89 detects the magnitudes of accelerations along predetermined three axial (e.g., xyz axes shown in FIG. 1) directions. It should be noted that the acceleration sensor 89 may detect an acceleration along one axial direction or accelerations along two axial directions.

Further, the main body apparatus 2 includes an angular velocity sensor 90. In the exemplary embodiment, the angular velocity sensor 90 detects angular velocities about predetermined three axes (e.g., the xyz axes shown in FIG. 1). It should be noted that the angular velocity sensor 90 may detect an angular velocity about one axis or angular velocities about two axes.

The acceleration sensor 89 and the angular velocity sensor 90 are connected to the processor 81, and the detection results of the acceleration sensor 89 and the angular velocity sensor 90 are output to the processor 81. Based on the detection results of the acceleration sensor 89 and the angular velocity sensor 90, the processor 81 can calculate information regarding the motion and/or the orientation of the main body apparatus 2.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 7:
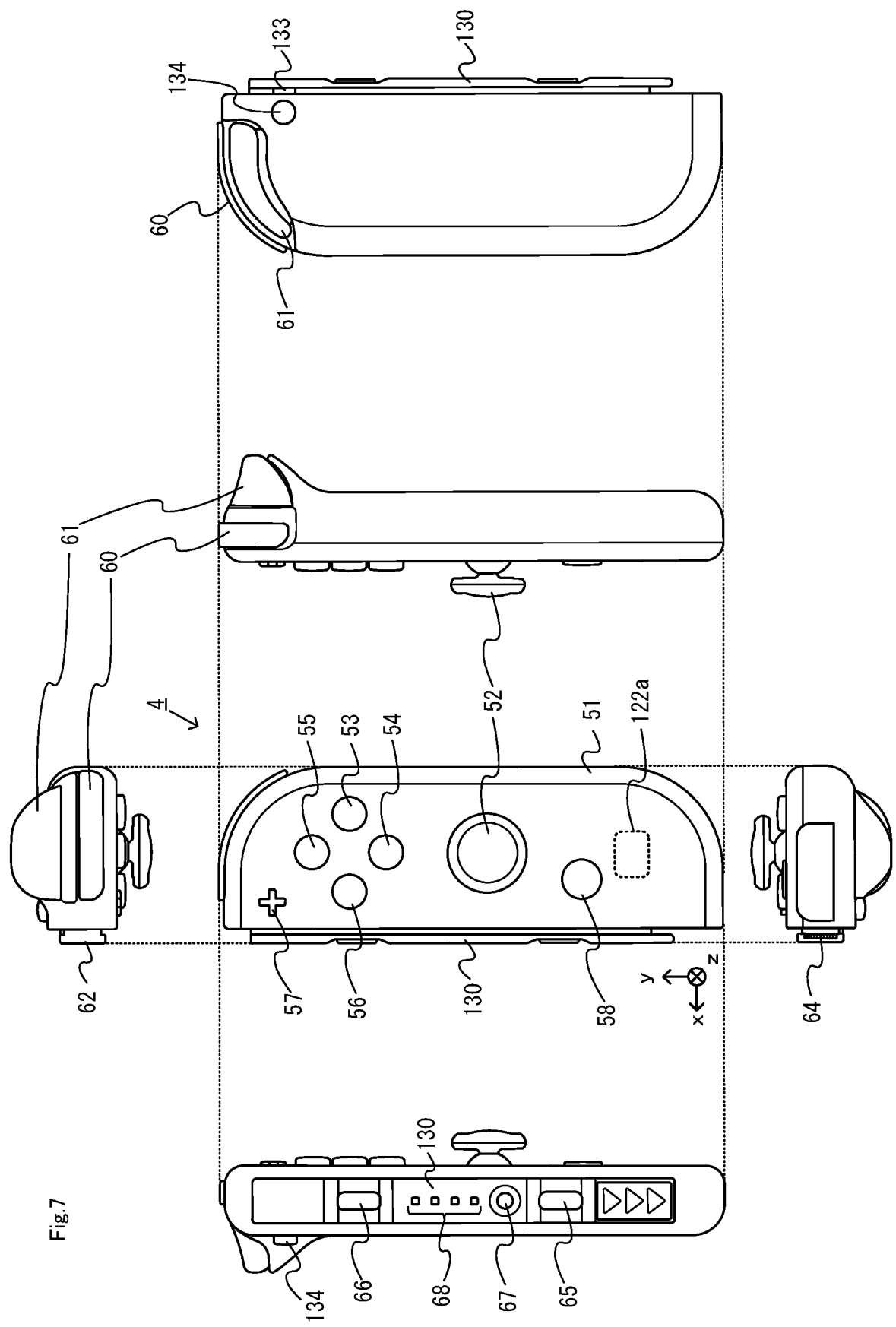
FIG. 7 is a six orthogonal views showing an example of a non-limiting right controller.
Figure 8:
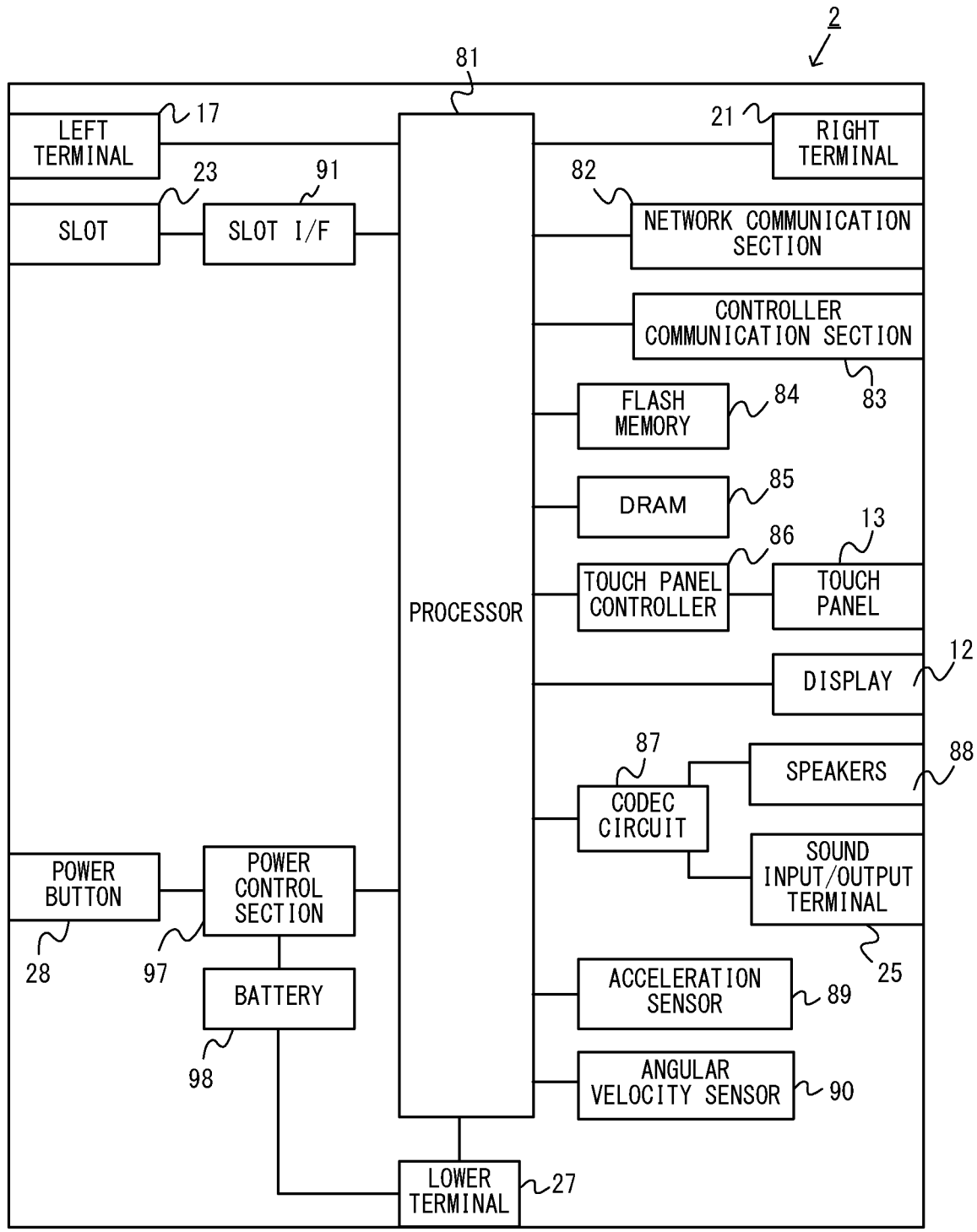
FIG. 8 is a block diagram showing an example of an internal configuration of the non-limiting main body apparatus.
Figure 9:
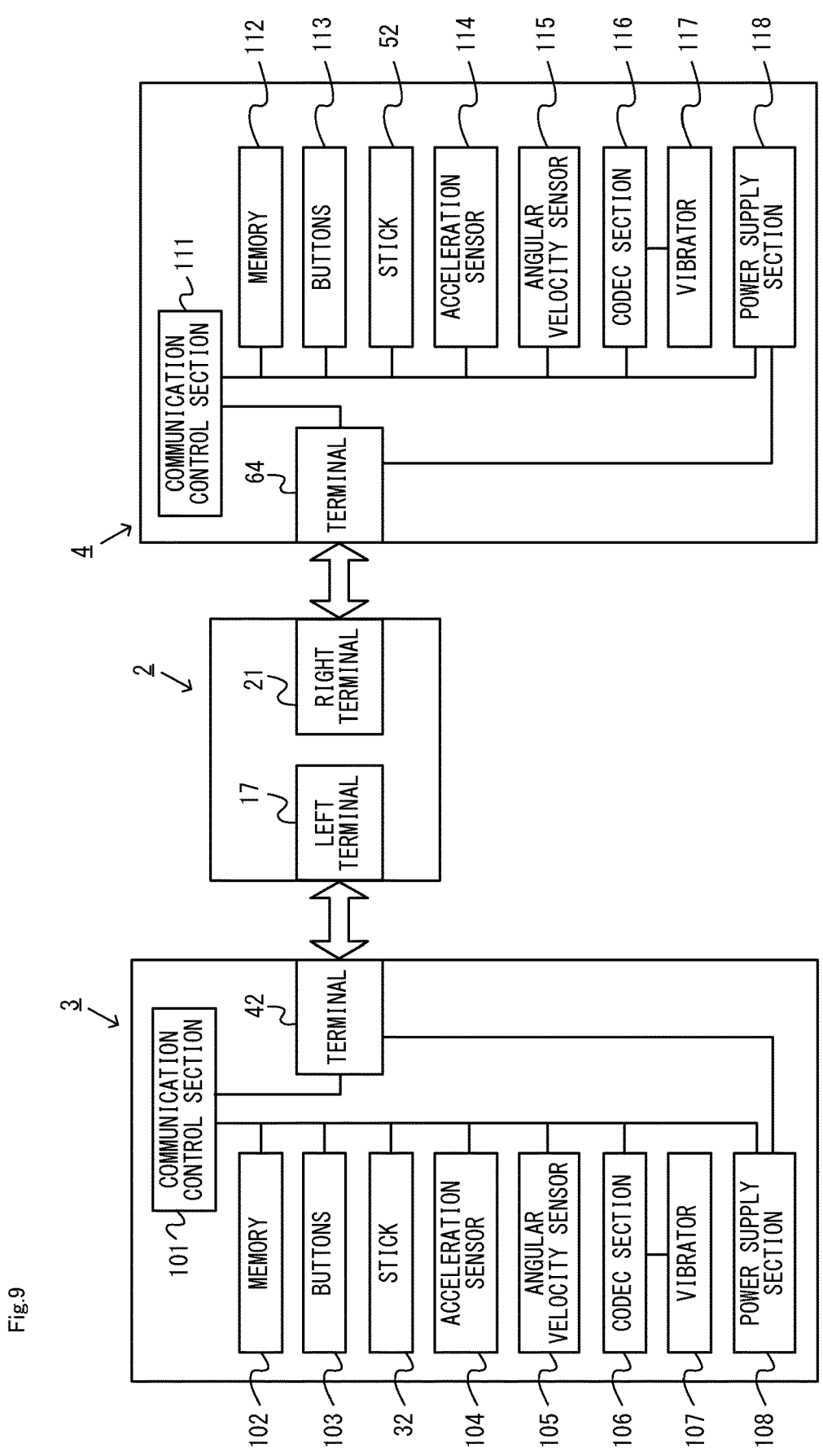
FIG. 9 is a block diagram showing an example of an internal configuration of the non-limiting main body apparatus, the non-limiting left controller and the non-limiting right controller.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The left controller 3 includes inertial sensors. Specifically, the left controller 3 includes an acceleration sensor 104. Further, the left controller 3 includes an angular velocity sensor 105. In the exemplary embodiment, the acceleration sensor 104 detects the magnitudes of accelerations along predetermined three axial (e.g., xyz axes shown in FIG. 4) directions. It should be noted that the acceleration sensor 104 may detect an acceleration along one axial direction or accelerations along two axial directions. In the exemplary embodiment, the angular velocity sensor 105 detects angular velocities about predetermined three axes (e.g., the xyz axes shown in FIG. 4). It should be noted that the angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are output to the communication control section 101 repeatedly at appropriate timing.

The communication control section 101 acquires information regarding an input (specifically, information regarding an operation or the detection result of the sensor) from each of input sections (specifically, the buttons 103, the analog stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data. Further, the main body apparatus 2 can calculate information regarding the motion and/or the orientation of the left controller 3 based on the operation data (specifically, the detection results of the acceleration sensor 104 and the angular velocity sensor 105).

The left controller 3 includes a vibrator 107 for giving notification to the user by a vibration. In the exemplary embodiment, the vibrator 107 is controlled by a command from the main body apparatus 2. That is, if receiving the above command from the main body apparatus 2, the communication control section 101 drives the vibrator 107 in accordance with the received command. Here, the left controller 3 includes a codec section 106. If receiving the above command, the communication control section 101 outputs a control signal corresponding to the command to the codec section 106. The codec section 106 generates a driving signal for driving the vibrator 107 from the control signal from the communication control section 101 and outputs the driving signal to the vibrator 107. Consequently, the vibrator 107 operates.

More specifically, the vibrator 107 is a linear vibration motor. Unlike a regular motor that rotationally moves, the linear vibration motor is driven in a predetermined direction in accordance with an input voltage and therefore can be vibrated at an amplitude and a frequency corresponding to the waveform of the input voltage. In the exemplary embodiment, a vibration control signal transmitted from the main body apparatus 2 to the left controller 3 may be a digital signal representing the frequency and the amplitude every unit of time. In another exemplary embodiment, the main body apparatus 2 may transmit information indicating the waveform itself. The transmission of only the amplitude and the frequency, however, enables a reduction in the amount of communication data. Additionally, to further reduce the amount of data, only the differences between the numerical values of the amplitude and the frequency at that time and the previous values may be transmitted, instead of the numerical values. In this case, the codec section 106 converts a digital signal indicating the values of the amplitude and the frequency acquired from the communication control section 101 into the waveform of an analog voltage and inputs a voltage in accordance with the resulting waveform, thereby driving the vibrator 107. Thus, the main body apparatus 2 changes the amplitude and the frequency to be transmitted every unit of time and thereby can control the amplitude and the frequency at which the vibrator 107 is to be vibrated at that time. It should be noted that not only a single amplitude and a single frequency, but also two or more amplitudes and two or more frequencies may be transmitted from the main body apparatus 2 to the left controller 3. In this case, the codec section 106 combines waveforms indicated by the plurality of received amplitudes and frequencies and thereby can generate the waveform of a voltage for controlling the vibrator 107.

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, the analog stick 52, and inertial sensors (an acceleration sensor 114 and an angular velocity sensor 115). These input sections have functions similar to those of the input sections of the left controller 3 and operate similarly to the input sections of the left controller 3.

Further, the right controller 4 includes a vibrator 117 and a codec section 116. The vibrator 117 and the codec section 116 operate similarly to the vibrator 107 and the codec section 106, respectively, of the left controller 3. That is, in accordance with a command from the main body apparatus 2, the communication control section 111 causes the vibrator 117 to operate, using the codec section 116.

The right controller 4 includes a power supply section 118. The power supply section 118 has a function similar to that of the power supply section 108 of the left controller 3 and operates similarly to the power supply section 108.

Note that in the present embodiment, the main unit 2 and the controllers 3 and 4 each include a slide portion, and the controllers 3 and 4 are attached (or "connected") to the main unit 2 by means of a slide mechanism, which is formed by these slide portions. The controllers 3 and 4 each include a slider as a slide portion. The main unit 2 includes, as a slide portion, a rail member capable of slidably engaging with the slider. Note that the slider of the controllers 3 and 4 will be described later. Although the rail member of the main unit 2 will not be described in detail, the rail member of the main unit 2 is similar to a rail member of the touch pen attachment 140 (the details of this rail member will be described later) in that it is capable of slidably engaging with the slider.

When attaching a controller to the main unit 2, a user first inserts the slider of the controller into the rail member of the main unit 2, thereby engaging the slider and the rail member with each other. Then, a user can slide the slider all the way into the rail member, thereby attaching the controller to the main unit 2.

In the present embodiment, as shown in FIG. 4, the controller is attached to the main unit 2 from the upper side (i.e., from the y-axis positive direction side). That is, the controller is attached to the main unit 2 by inserting the slider (specifically, the lower end of the slider) into the upper end portion of the rail member. In other words, it can be said that the main unit 2 is attached to the controller from the lower side. This allows a user to attach/detach the controller to/from the main unit 2 while the main unit 2 is placed on the floor, thereby facilitating the attachment/detachment.

As described above, with the game system 1 of the present embodiment, a user can hold and use the entirety of the main unit 2 and the controllers 3 and 4 by attaching the controllers 3 and 4 to the main unit 2 or can hold and use only a controller by removing the controller 3 or 4 from the main unit 2. The touch pen attachment of the present embodiment is used while it is attached to a controller having been removed from the main unit 2.

(1-2: Outline of Attachment to Controller)

Figure 10:
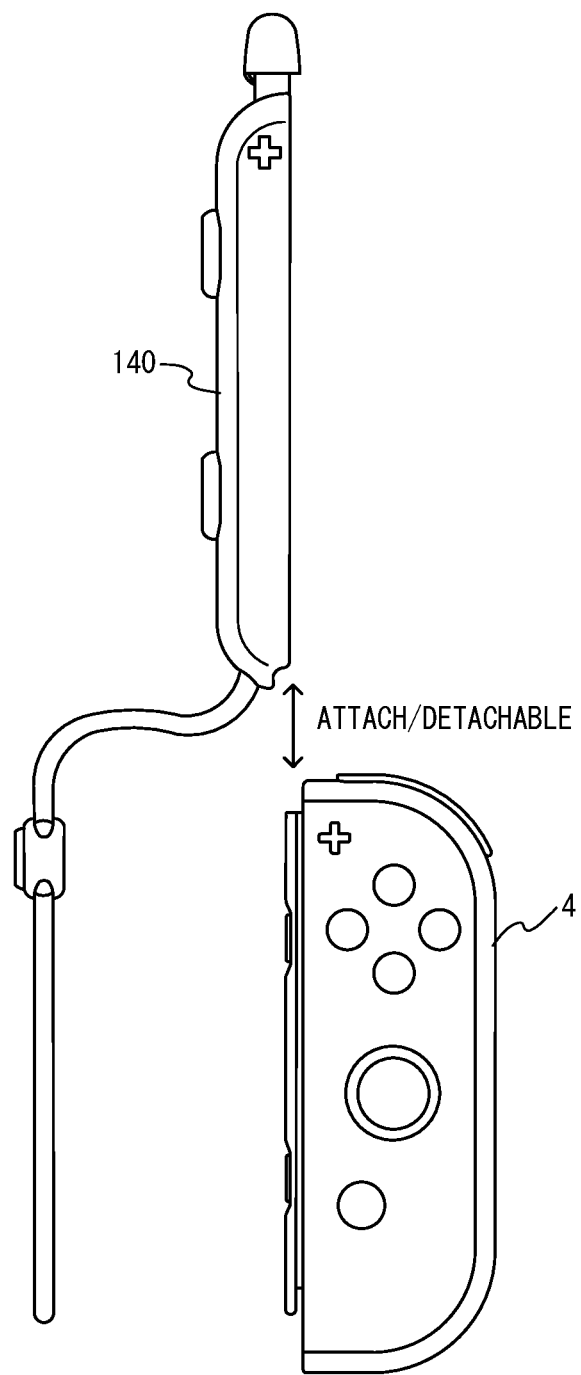
FIG. 10 shows an example state in which a non-limiting touch pen attachment is attached to a right controller.
Figure 11:
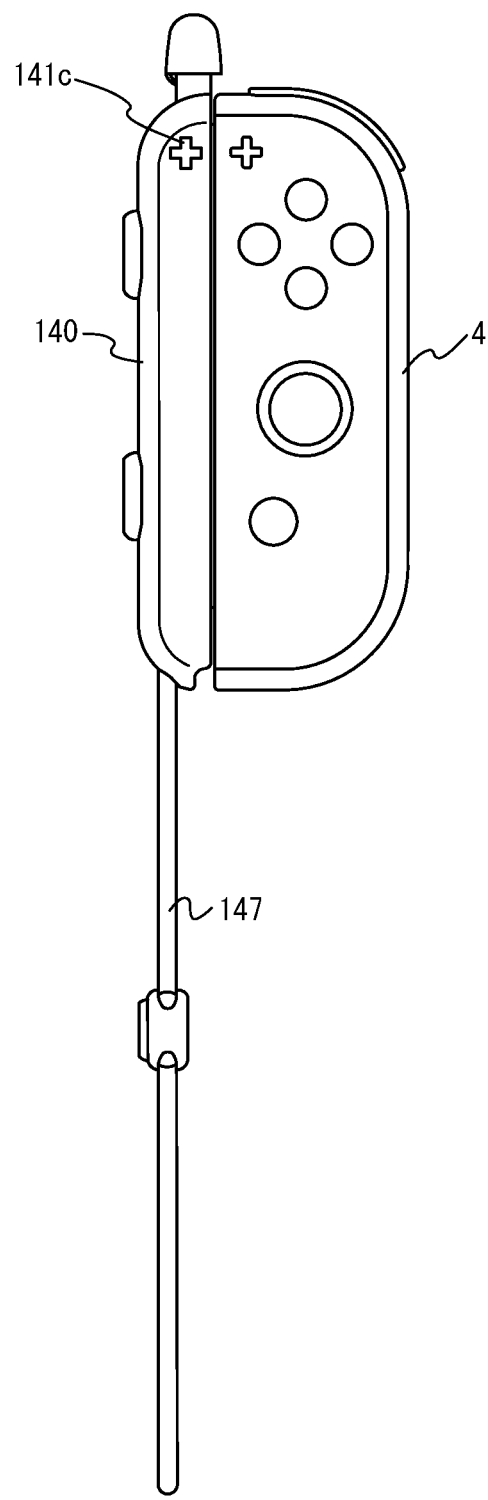
FIG. 11 shows an example state in which a non-limiting touch pen attachment is attached to a right controller.
Figure 12:
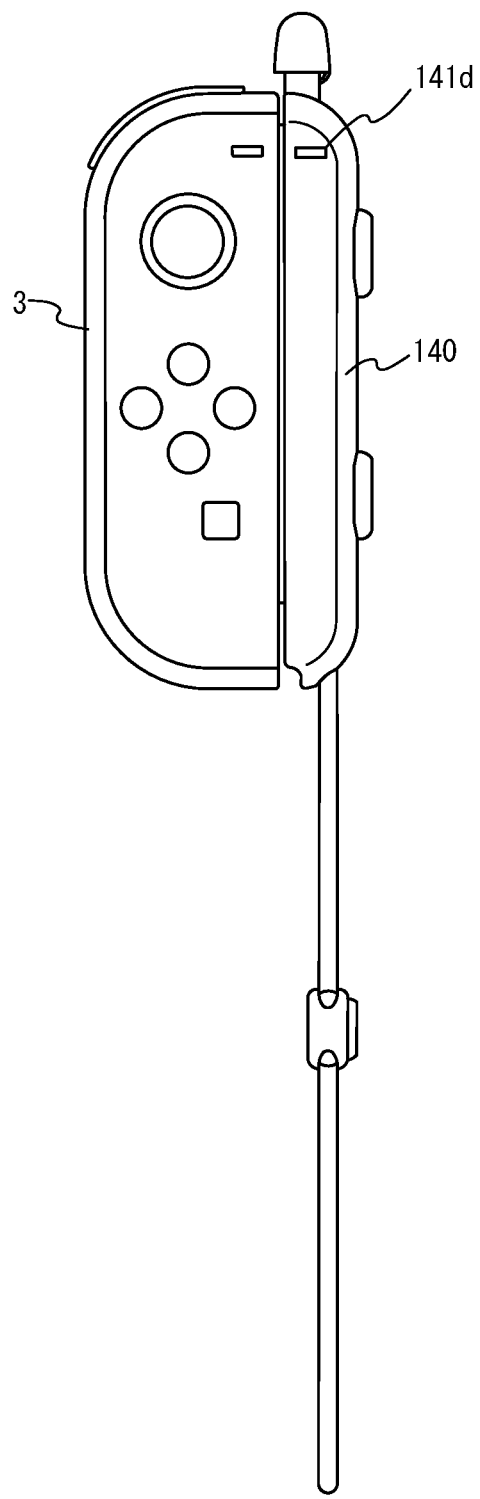
FIG. 12 shows an example state in which a non-limiting touch pen attachment is attached to a left controller.

Next, referring to FIG. 10 to FIG. 12, how the touch pen attachment 140 is attached to the controller will be outlined. FIG. 10 shows an example of how the touch pen attachment is attached to the right controller. In the present embodiment, the touch pen attachment 140 includes a rail member (the details of the rail member will be described later) capable of slidably engaging with the slider of the controller. Therefore, the touch pen attachment 140 can be attached to the controller by inserting the slider of the controller into the rail member of the touch pen attachment 140 in a similar manner to that when attaching the controller to the main unit 2 (see FIG. 10). Note that in the present embodiment, the touch pen attachment 140 is attached to the controller by first inserting the lower side of the touch pen attachment 140 into the upper side of the controller as shown in FIG. 10 (the reason for this will be described later).

FIG. 11 shows an example state in which the touch pen attachment is attached to the right controller. As shown in FIG. 11, with the touch pen attachment 140 attached to the right controller 4, the right controller 4 and the touch pen attachment 140 have an integral appearance (i.e., they appear as if they were an integral unit). Therefore, a user can hold and use the right controller 4 and the touch pen attachment 140 as an integral unit. Then, a user may hold the right controller 4 and the touch pen attachment 140 with the strap 147 of the touch pen attachment 140 put on the wrist. Then, in a situation in which a user swings the right controller 4 and the touch pen attachment 140, for example, it is possible to control the distance between the user's hand and the right controller 4 and the touch pen attachment 140 within a predetermined range.

FIG. 12 shows an example state in which the touch pen attachment is attached to the left controller. As shown in FIG. 11 and FIG. 12, in the present embodiment, the touch pen attachment 140 can be attached to either the left controller 3 or the right controller 4. Note that the orientation of the touch pen attachment 140 when the touch pen attachment 140 is attached to the left controller 3 is opposite to that when the touch pen attachment 140 is attached to the right controller 4 (see FIG. 11 and FIG. 12). When the touch pen attachment 140 is attached to the left controller 3, the touch pen attachment 140 is attached to the left controller 3 from the upper side, as when attaching the touch pen attachment 140 to the right controller 4.

[2. Configuration of Controller]

Next, referring to FIG. 7 and FIG. 13, an example configuration of the right controller 4 will be described.

(2-1: Housing)

As shown in FIG. 7, the right controller 4 includes a housing 51. In the present embodiment, the housing 51 has an oblong shape (elongated in the y-axis direction in FIG. 7). The housing 51 generally has a rectangular parallelepiped shape with six sides. As shown in FIG. 7, the right corner portion of the primary surface of the housing 51 (in other words, the front side surface, i.e., the z-axis negative direction side surface shown in FIG. 7) has a more rounded shape than the left corner portion. That is, the connecting portion between the upper side surface and the right side surface of the housing 51 and the connecting portion between the lower side surface and the right side surface of the housing 51 are more rounded (in other words, round-cornered with a greater radius) than the connecting portion between the upper side surface and the left side surface and the connecting portion between the lower side surface and the left side surface. Therefore, when the right controller 4 is connected to the main unit 2 or the touch pen attachment 140 (see FIG. 3 and FIG. 11), the corner portions of the device including the right controller 4 will be rounded, making it easier for a user to hold the device.

(2-2: Slider)

As shown in FIG. 7, the right controller 4 includes a slider 130. As described above, the slider 130 is a slide portion for connecting the right controller 4 to the main unit 2 or the touch pen attachment 140. The slider 130 is provided so as to protrude from the left side surface (i.e., the side surface on the x-axis positive direction side) of the right controller 4.

Figure 13:
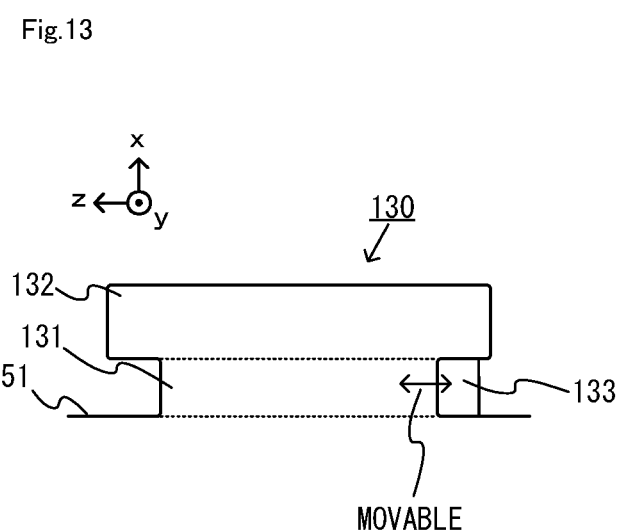
FIG. 13 is an enlarged view showing a non-limiting example slider of a right controller.

FIG. 13 is an enlarged view showing the slider of the right controller. FIG. 13 is an enlarged view showing the slider 130 shown in FIG. 7 as seen from above (i.e., from the y-axis positive direction side). As shown in FIG. 13, the slider 130 is generally shaped so that a cross section thereof taken along a plane perpendicular to the slide direction (i.e., the y-axis direction) is T-shaped.

Specifically, the slider 130 includes a shaft 131 and a top surface portion 132. The shaft 131 is provided so as to protrude from the housing 51. The top surface portion 132 is provided on the side opposite from the housing 51 (i.e., the x-axis positive direction side) of the shaft 131. The width of the top surface portion 132 (i.e., the length with respect to the z-axis direction) is greater than the width of the shaft 131. The end of the top surface portion 132 in the z-axis direction is located so as to protrude past (in other words, located on the outer side of) the end of the shaft 131 in the z-axis direction.

Thus, the cross section of the slider 130 taken along a plane perpendicular to the slide direction has a shape such that the width of the first portion (i.e., the shaft 131) protruding from the side surface of the housing 51 is less than the width of the second portion (i.e., the top surface portion 132) farther away from the side surface of the housing 51 than the first portion. With such a shape, the slider 130 in engagement with the rail member is secured so as not to come off the rail member in the direction perpendicular to the slide direction (see FIG. 13), the details of which will be described later.

As shown in FIG. 7 and FIG. 13, in the present embodiment, the right controller 4 includes a projection 133. As shown in FIG. 13, the projection 133 is provided so as to protrude from the side surface of the shaft 131 of the slider 130. Specifically, a hole is provided on the side surface of the shaft 131, and the projection 133 is provided so as to protrude through the hole. The projection 133 can move between the protruding state in which the projection 133 is protruding from the side surface of the shaft 131 and a state in which the projection 133 has moved from the position in the protruding state toward the inside of the side surface (referred to as the "retracted state"; note however that the projection 133 does not need to be retracted completely inside the shaft 131). In the present embodiment, the projection 133 is biased toward the protruding state by means of an elastic member (referred to also as a "biasing member") such as a spring, for example.

In a state in which the right controller 4 is attached to the main unit 2 (referred to as the "attached state"), the projection 133 is used for locking the slide movement of the right controller 4 with respect to the main unit 2. The rail member of the main unit 2 includes a cut-out portion at a position corresponding to the projection 133 in the attached state. Although not shown in the figure, the cut-out portion of the rail member of the main unit 2 is formed at a position similar to that of a cut-out portion provided in the rail member of the touch pen attachment 140 (the details of which will be described later) (see FIG. 19). Note that in the present embodiment, the projection 133 is provided along the upper half of the slider 130 (i.e., on the y-axis positive direction side), and the cut-out portion is provided along the upper half of the rail member. Thus, in the attached state, the projection 133 in the protruding state engages with the cut-out portion of the rail member. Thus, the projection 133 is capable of generally preventing (in other words, locking) the slide movement of the right controller 4 against the main unit 2.

As shown in FIG. 7, the right controller 4 includes a release button 134. Although not shown in the figure, the release button 134 is configured so that the release button 134 can move in conjunction with the projection 133. Specifically, the projection 133 is in the protruding state when the release button 134 is not pressed, and the projection 133 is brought into the retracted state in response to the release button 134 being pressed. In the attached state, when the projection 133 is in the retracted state, the projection 133 does not engage (or not substantially engage) with the cut-out portion of the rail member. Therefore, in the retracted state, the engagement (in other words, the lock) by the projection 133 is released.

Thus, a user can press the release button 134 to bring the projection 133 into the retracted state, releasing the lock by the projection 133. Therefore, a user can easily remove the right controller 4 from the main unit 2 by sliding the right controller 4 while the release button 134 is pressed to release the lock.

(2-3: Input Section)

The right controller 4 includes operation sections (or "input sections") allowing a user to perform input operations. In the present embodiment, the right controller 4 includes an analog stick 52 and buttons 53 to 58, 60, 61, 65 and 66 as operation sections.

A second L button 65 and a second R button 66 are provided on the top surface of the slider 130. Herein, the top surface of the slider is a surface that is facing substantially the same direction as the surface of the housing 51 on which the slider is provided. In other words, the top surface is a surface that opposes the bottom surface of the rail member of the main unit 2 when the controller is attached to the main unit 2. When a user holds the right controller 4 using both hands, for example, the buttons 65 and 66 provided on the top surface of the slider 130 are operated using the index finger and/or the middle finger of the user, for example.

The right controller 4 includes a pairing button 67. The pairing button 67 is provided on the top surface of the slider 130. In the present embodiment, the pairing button 67 is used to give instructions regarding wireless communication between the right controller 4 and the main unit 2. Processes regarding wireless communication include, for example, a setting (referred to also as pairing) process regarding wireless communication between the right controller 4 and the main unit 2, and a process (also referred to as a resetting process) of disconnecting and then reconnecting wireless communication.

Note that in the present embodiment, the buttons 65 to 67 provided on the top surface of the slider 130 are provided so as not to protrude past the top surface. That is, the operation surfaces of the buttons 65 to 67 are arranged flush with the top surface of the slider 130 or arranged at a position sunken from the top surface. This allows the slider 130 to slide smoothly against the rail member when the slider 130 is engaged with the rail member of the main unit 2 or the touch pen attachment 140.

The right controller 4 includes an acceleration sensor and an angular velocity sensor as example input sections in the present embodiment. Note that in other embodiments, another type of sensor may be used as a sensor (e.g., an inertial sensor) for calculating the movement, the attitude and/or the position of the controller.

(2-4: Other Elements)

The right controller 4 includes an indicator LED 68. The indicator LED 68 is an indicator section for indicating predetermined information to the user. In the present embodiment, the right controller 4 includes four LEDs as the indicator LED 68. For example, the predetermined information may be the number assigned to the right controller 4 by the main unit 2 or may be information regarding the remaining battery level of the right controller 4.

As shown in FIG. 7, in the present embodiment, the indicator LED 68 is provided on the slider 130 (specifically, on the top surface of the slider 130). Thus, the indicator LED 68 is arranged at such a position that the indicator LED 68 cannot be seen with the right controller 4 attached to the main unit 2, and the indicator LED 68 is used primarily when the right controller 4 is detached from the main unit 2. In the present embodiment, the indicator LED 68 is provided between the second L button 65 and the second R button 66. Then, when a user holds the right controller 4 using both hands, for example, the indicator LED 68 is arranged at such a position that it is easy to see the indicator LED 68 (in other words, such a position that it is unlikely blocked by the hands of the user) for the user who operates the second L button 65 using the index finger of the left hand and the second R button 66 using the index finger of the right hand.

(2-5: Configuration of Left Controller 3)

The left controller 3 is configured differently from the right controller 4 with respect to the shape of the housing (the housing of the left controller 3 has a shape that is generally in left-right symmetry with the housing 51 of the right controller 4) and the arrangement of the operation sections (the analog stick and the buttons) (see FIG. 6 and FIG. 7).

On the other hand, the left controller 3 has a similar configuration to that of the right controller 4 with respect to the slide portion (specifically, the slider). Note that the right controller 4 includes the slider provided on the left side surface of the housing 51, whereas the left controller 3 includes the slider provided on the right side surface of the housing (see FIG. 6 and FIG. 7). Note however that in the present embodiment, the right controller 4 is the same as the left controller 3 with respect to the slider and the members to be provided on the slider (specifically, the buttons 65 to 67 and the indicator LED 68).

The left controller 3 includes an acceleration sensor and an angular velocity sensor, as does the right controller 4, and a user is allowed to perform an operation of moving the left controller 3 itself.

In the present embodiment, the second L button and the second R button are provided on the top surface of the slider of the controllers 3 and 4. The second L button and the second R button are arranged at the same position on the left controller 3 and on the right controller 4 with respect to the up-down direction (i.e., the y-axis direction). Then, when the touch pen attachment 140 is attached to the controller 3 or 4, it is possible to operate the second L button and the second R button by pressing buttons on the touch pen attachment 140, the details of which will be described later.

In the present embodiment, indicator LEDs (four indicator LEDs in the present embodiment) are provided on the top surface of the slider of each of the controllers 3 and 4. The indicator LEDs are arranged at the same position on the left controller 3 and on the right controller 4 with respect to the up-down direction (i.e., the y-axis direction). Then, when the touch pen attachment 140 is attached to the controller 3 or 4, it is possible to allow light from an indicator LED to be output from a light-exiting port of the touch pen attachment 140, the details of which will be described later.

Note that for the controllers 3 and 4, there is no particular limitation on the shape, the number and the arrangement of the various elements (specifically, the slider, the stick, the buttons, the LEDs, etc.) provided on the housing. For example, in other embodiments, the controllers 3 and 4 may include a direction input section of a different type from an analog stick. The slider may be arranged at a position that corresponds to the position of the rail member provided on the main unit 2, and may be, for example, arranged on the primary surface or the reverse surface of the housing. In other embodiments, one or more of the various elements described above may be absent on the controllers 3 and 4.

[3. Configuration of Touch Pen Attachment]

Figure 14:
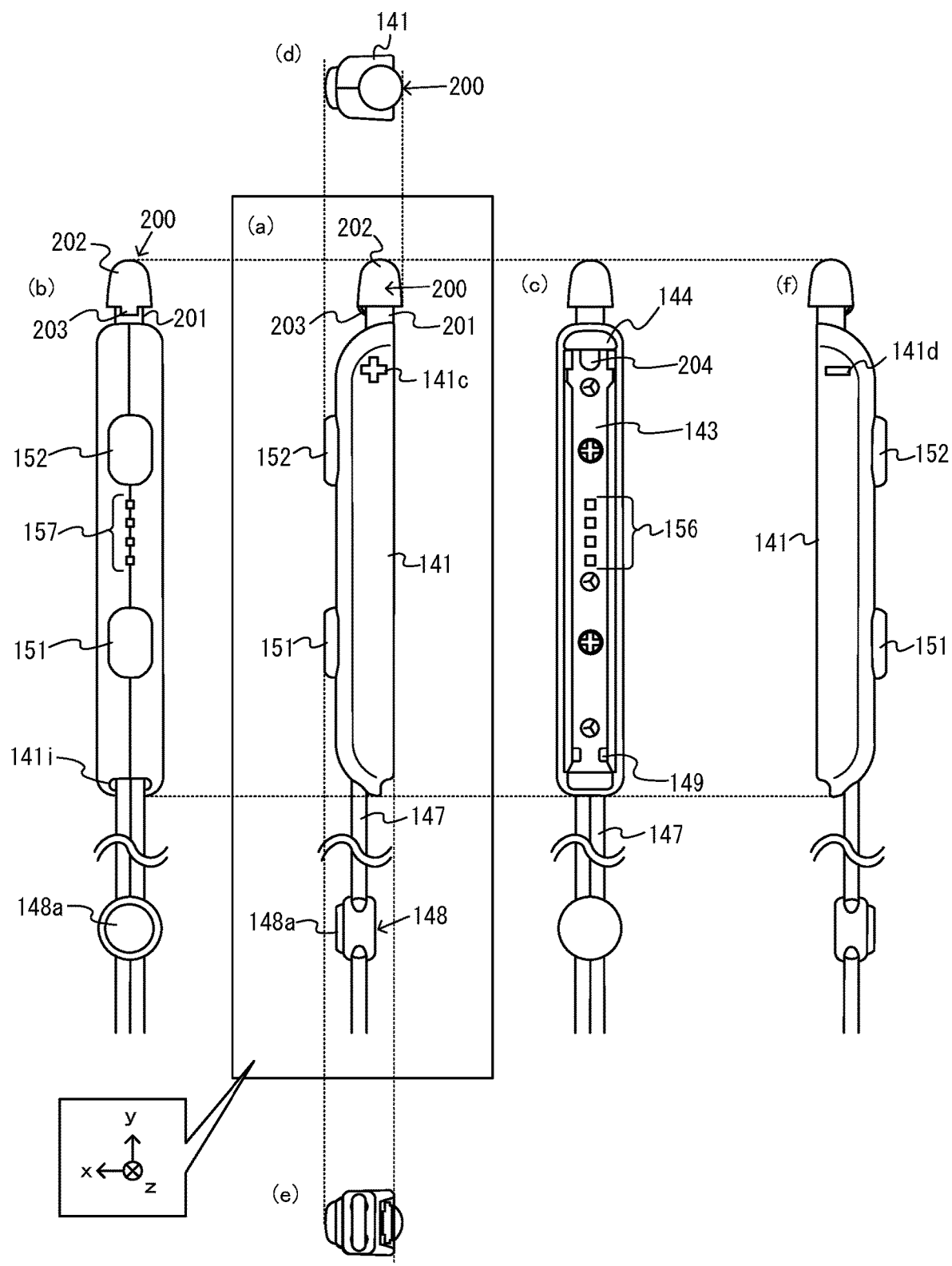
FIG. 14 is a six-sided view showing a non-limiting example touch pen attachment.
Figure 15:
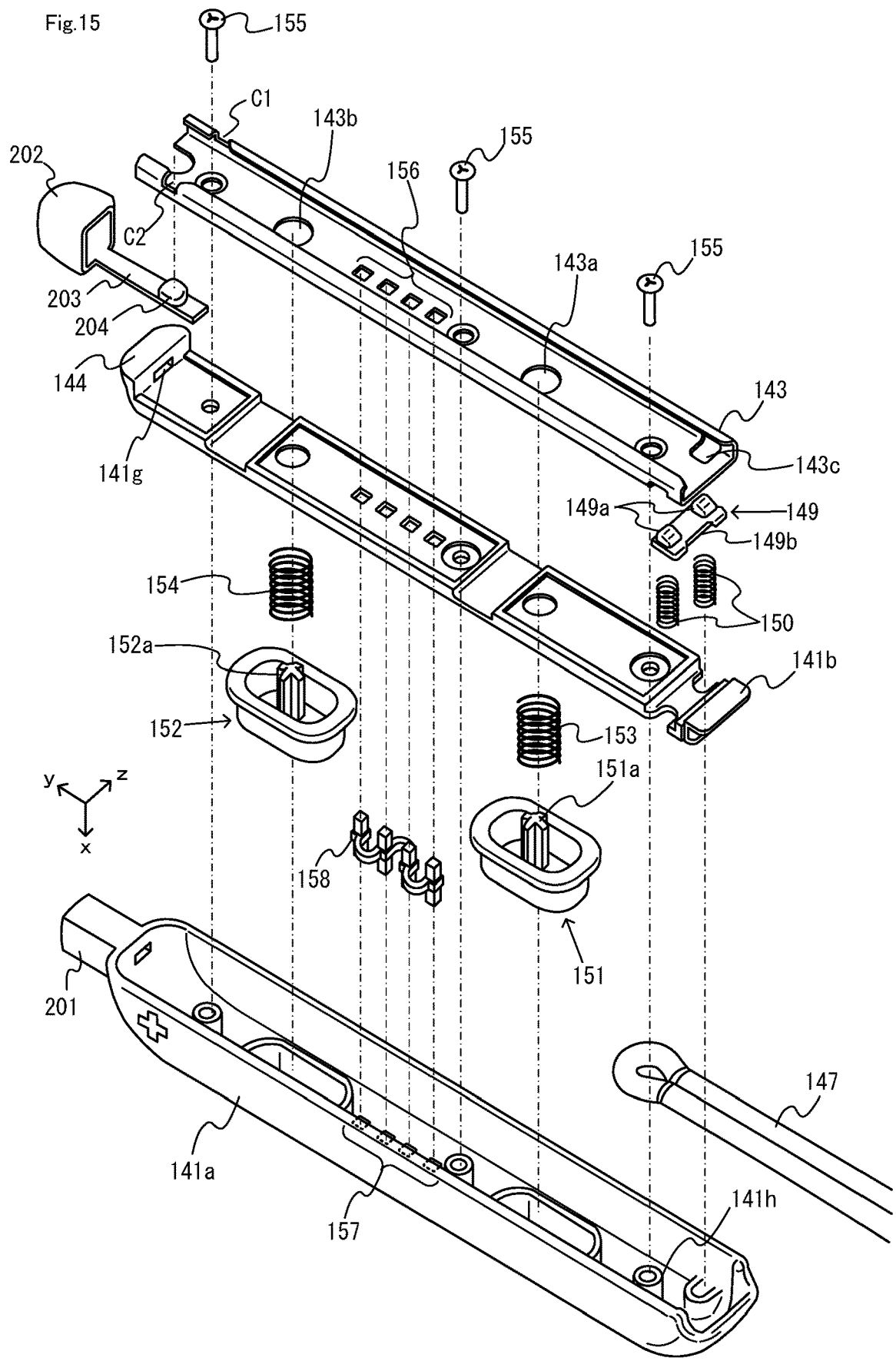
FIG. 15 is an exploded perspective view showing a non-limiting example of the touch pen attachment shown in FIG. 14.

Next, referring to FIG. 14 to FIG. 22, an example configuration of the touch pen attachment 140 will be described. FIG. 14 is a six-sided view showing an example touch pen attachment. FIG. 15 is an exploded perspective view showing the example touch pen attachment shown in FIG. 14. Note that the xyz coordinate system of FIG. 14 represents directions in the front view ((a) of FIG. 14). In (a) to (c) and (0 of FIG. 14, a part of the strap 147 is not shown for the purpose of making it easier to see elements other than the strap 147.

(3-1: Elements Regarding Housing)

As shown in FIG. 14, the touch pen attachment 140 includes a housing 141. While there is no particular limitation on the shape of the housing 141, the housing 141 has an oblong shape (elongated in the up-down direction in FIG. 14) in the present embodiment. The housing 141 includes an engaging surface (in other words, the right side surface, i.e., the x-axis negative direction side surface) on which a rail member 143 to be described later is provided, and a button provision surface (in other words, the left side surface, i.e., the x-axis positive direction side surface) on which the buttons 151 and 152 to be described later are provided. As shown in FIG. 15, in the present embodiment, the housing 141 includes a first member 141a and a second member 141b. The second member 141b is a member that forms the engaging surface, and the first member 141a is a member that forms surfaces other than the engaging surface (including the button provision surface). The first member 141a and the second member 141b are coupled together with screws 155 (herein, three screws 155), thereby forming the housing 141. Note that it can be said that the housing also includes the rail member 143, in addition to the first member 141a and the second member 141b. That is, it can be said that a rail member 143 is also a part of the housing.

As shown in FIG. 14, in the present embodiment, the opposite end portions of the button provision surface of the housing 141 in the slide direction (i.e., the opposite ends in the y-axis direction) are each a rounded curved surface, except for the touch pen portion to be described below. Then, the device including the touch pen attachment 140 and the controller to which the touch pen attachment 140 is attached (hereinafter referred to as the "touch-pen-attached controller device") can have rounded corner portions (see FIG. 11 and FIG. 12). Thus, it is possible to provide a device that is easy to hold for a user.

In the present embodiment, the two surfaces (i.e., the front surface and the rear surface; in other words, the z-axis negative direction side surface and the z-axis positive direction side surface) provided between the engaging surface and the button provision surface are marked differently from each other. Specifically, as shown in FIG. 14, the front surface of the housing 141 is marked with a plus mark 141c representing "+", and the rear surface of the housing 141 is marked with a minus mark 141d representing "−". These marks 141c and 141d are provided so that a user can recognize the orientation of the touch pen attachment 140 to be attached to the two different controllers 3 and 4. That is, when the touch pen attachment 140 is attached to the right controller 4, which has the "+"-shaped button 57 on the primary surface, the plus mark 141c prompts a user to attach the touch pen attachment 140 so that the front surface of the housing 141 marked with the plus mark 141c is facing the same direction as the primary surface of the right controller 4 (see FIG. 11). When the touch pen attachment 140 is attached to the left controller 3, which has the "−"-shaped button on the primary surface, the minus mark 141d prompts a user to attach the touch pen attachment 140 so that the rear surface of the housing 141 marked with the minus mark 141d is facing the same direction as the primary surface of the left controller 3 (see FIG. 12). Thus, when attaching the touch pen attachment 140 to the controller 3 or 4, a user can easily recognize the orientation of the touch pen attachment 140.

Note that in other embodiments, other methods of distinction may be used in addition to (or instead of) the marks 141c and 141d. For example, in other embodiments, the front surface side and the rear surface side of the housing 141 may differ from each other in appearance (e.g., color, pattern or texture (specifically, the presence/absence of a luster)). The appearance of the primary surface of the left controller 3 may be the same as (or similar to) that of the front surface of the housing 141, or the appearance of the primary surface of the right controller 4 may be the same as (or similar to) that of the rear surface of the housing 141.

(3-2: Elements Regarding Touch Pen)

Next, referring to FIG. 14 to FIG. 16, the configuration of the touch pen portion of the touch pen attachment 140 will be described. As shown in FIG. 14, the touch pen attachment 140 includes the touch pen portion 200. The touch pen portion 200 is a rod-shaped component with a conductive pen point provided at the tip thereof, the details of which will be described later. In the exemplary embodiment, the touch pen portion 200 is provided at an end portion of the housing 141 on the upper side (i.e., the y-axis positive direction side). That is, the touch pen portion 200 is provided at one of the end portions of the housing 141 in the slide direction that is opposite to the side from which the controller is inserted. The touch pen portion 200 is provided at one of the end portions of the housing 141 in the slide direction at which a stopper portion 144 to be described later is provided.

The touch pen portion 200 includes a pen shaft portion 201 and a pen point 202 (see FIG. 14). The pen shaft portion 201 is rod-shaped, and is provided so as to extend in the upward direction from the upper end portion of the housing 141. Therefore, the touch pen portion 200 is provided so as to protrude in the upward direction from the upper end portion of the housing 141. In the exemplary embodiment, as shown in FIG. 15, the pen shaft portion 201 is provided as an integral part of the housing 141 (more specifically, the first member 141a). Note however that in other embodiments, the pen shaft portion 201 may be separate from the housing 141.

The pen point 202 is provided at the tip of the pen shaft portion 201 (specifically, the end portion on the y-axis positive direction side) (see FIG. 14). In the exemplary embodiment, the pen point 202 is formed from a conductive substance. Therefore, with the touch pen attachment 140 of the exemplary embodiment, it is possible to make an input on the capacitive touch panel 13 (note that it can be also used with a pressure-sensitive touch panel). Specifically, the material of the pen point 202 in the exemplary embodiment is a conductive rubber. Note that in other embodiments the material of the pen point 202 may be a conductive fiber. When the material of the pen point 202 is a conductive rubber or a conductive fiber, which is softer than the surface of the touch panel 13, it is possible to reduce the possibility that the pen point 202 damages the surface of the touch panel 13.

As shown in FIG. 15, the pen point 202 is shaped so as to cover the tip portion of the pen shaft portion 201. Specifically, an end portion of the pen point 202 on the upper side (i.e., the y-axis positive direction side) is formed as a curved surface. This makes it possible to smoothly perform operations such as drawing a line on the touch panel 13 and making a gesture input on the touch panel 13. Note that there is no limitation on the shape of the tip portion of the pen point 202. For example, in other embodiments, the tip portion of the pen point 202 may have a pointed shape. A hole into which the pen shaft portion 201 is inserted is formed at a lower end portion of the pen point 202 (see FIG. 15). In the exemplary embodiment, the pen shaft portion 201 and the pen point 202 are connected together by inserting the tip of the pen shaft portion 201 into the hole (in other words, putting the pen point 202 on the tip of the pen shaft portion 201) (see FIG. 16 to be discussed later).

Figure 16:
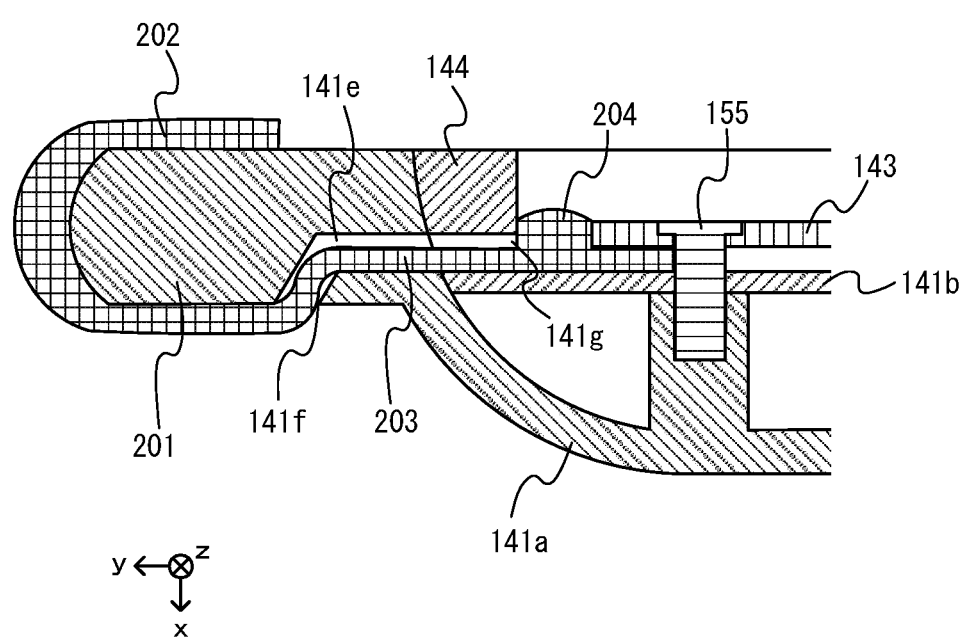
FIG. 16 schematically shows an example cross section of an upper end portion of a non-limiting touch pen attachment.

In the exemplary embodiment, the touch pen attachment 140 includes a connecting portion 203 (see FIG. 14 to FIG. 16). The connecting portion 203 connects together the pen point 202 and the rail member 143. In the exemplary embodiment, the connecting portion 203 and the rail member 143 are both of a conductive substance. Therefore, by connecting the rail member 143 with the pen point 202 by the connecting portion 203, it is possible to increase the capacitance of the pen point 202 (i.e., to ensure a sufficient capacitance for the touch panel 13 to detect the pen point 202). Then, when a touch input is made on the touch panel 13 of the main body apparatus 2 using the touch pen attachment 140, it is easier for the touch panel 13 to detect the pen point 202. That is, according to the exemplary embodiment, it is possible to make it easier to make a touch input using the touch pen attachment 140. According to the exemplary embodiment, by increasing the capacitance of the pen point 202 using the rail member 143, there is no need to make the housing 141 of a conductive material, and it is therefore possible to improve the degree of freedom in designing the appearance of the housing 141.

In the exemplary embodiment, the connecting portion 203 is provided as an integral part of the pen point 202. That is, the connecting portion 203 is made of the same conductive rubber as the pen point 202. Note that in other embodiments, the connecting portion 203 may be separate from, and connected to, the pen point 202. The connecting portion 203 may be of any conductive substance, and may be of a different material from the pen point 202 (e.g., a metal). The rail member 143 may be of any conductive substance, and may be of a conductive substance other than a metal.

The connecting portion 203 is provided so as to extend in the downward direction from the lower end portion of the pen point 202 (see FIG. 15). Note that in the exemplary embodiment, the material of the connecting portion 203 is a (conductive) rubber and is deformable. The connecting portion 203 extends from the pen point 202 into the inside of the housing 141 through a hole provided in the housing 141 and is connected to the rail member 143, the details of which will be described later.

FIG. 16 schematically shows a cross section of an upper end portion of the touch pen attachment. FIG. 16 is a cross-sectional view along a cross section that passes through the center in the front-rear direction (i.e., the z axis) and that is perpendicular to the front-rear direction. Note that "schematically show" as used herein means that the size and shape of components to be discussed (e.g., the connecting portion 203, etc., in FIG. 16) and the positional relationship therebetween are shown to be different from those in other figures for the purpose of making it easier to see the components.

As shown in FIG. 16, a hole 141e is formed in the pen shaft portion 201 and the housing 141. One opening 141f of the hole 141e is provided on the pen shaft portion 201. Specifically, the opening 141f is formed on one of the surfaces of the pen shaft portion 201 that faces the same side as the button provision surface of the housing 141 (i.e., a surface that faces the x-axis positive direction side). Another opening 141g of the hole 141e is formed in the second member 141b of the housing 141. It can also be said that the opening 141g is formed in the stopper portion 144. As shown in FIG. 16, the hole 141e is formed so as to run through the pen shaft portion 201, the first member 141a of the housing 141, and the second member 141b of the housing 141.

As shown in FIG. 16, the connecting portion 203 is provided to run through a hole 144e. In the exemplary embodiment, the rail member 143 is attached to the housing 141 by three screws 155 (see FIG. 15), the details of which will be described later. An end portion of the connecting portion 203 on the lower side (i.e., the y-axis negative direction side) is sandwiched between the housing 141 (more specifically, the second member 141b) and the rail member 143. Thus, the lower end portion of the connecting portion 203 is secured on the housing 141. The connecting portion 203 is electrically connected to the rail member 143. In the exemplary embodiment, since the housing 141 and the rail member 143 are secured together by the screws 155, with the connecting portion 203 sandwiched therebetween, the connecting portion 203 and the rail member 143 can be reliably brought into contact with each other.

As described above, in the exemplary embodiment, the connecting portion 203 is arranged in the hole 144e formed in the housing 141. That is, the connecting portion 203 runs through the hole 144e formed in the housing 141 to connect together the pen point 202 and the rail member 143. Then, it is possible to reduce the possibility that the connecting portion 203 comes into contact with the controller when the touch pen attachment 140 is attached to the controller, thereby making the connecting portion 203 less interfering. It is possible to reduce the possibility that the connecting portion 203 contacts and damages other components. Note that in other embodiments, there is no limitation on the arrangement of the connecting portion 203, and the connecting portion 203 may be connected to the rail member 143 through the outside of the housing 141 (instead of running through the hole 144e as in the exemplary embodiment).

In the exemplary embodiment, the opening 141f of the hole 144e on the connecting portion 203 side is formed on a surface of the pen shaft portion 201 that faces a different direction than the engaging surface of the housing 141 (specifically, the surface that faces the same side as the button provision surface). Thus, it is possible to further reduce the possibility that the connecting portion 203 comes into contact with the controller when the touch pen attachment 140 is attached to the controller.

The touch pen attachment 140 includes a projection 204. The projection 204 is provided in order to reduce the looseness between controller and the touch pen attachment 140 with the touch pen attachment 140 attached to the controller, the details of which will be described later.

In the exemplary embodiment, the projection 204 is provided on the connecting portion 203 (see FIG. 15 and FIG. 16). Specifically, the projection 204 is provided as an integral part of the connecting portion 203. In the exemplary embodiment, a hole is formed on the bottom surface of the rail member 143, and the projection 204 is provided so as to protrude relative to the bottom surface of the rail member 143 (see FIG. 16). Thus, the projection 204 is provided on the bottom surface of the rail member 143.

As described above, in the exemplary embodiment, the connecting portion 203 and the projection 204 are provided as an integral part. Thus, it is possible to reduce the number of components of the touch pen attachment 140. Note that in other embodiments, the projection 204 and the connecting portion 203 may be separate from each other. Then, the material of the projection 204 may be any elastic material, and does not need to be a conductive substance. In the exemplary embodiment, the projection 204 is made of a rubber, and the projection 204 is unlikely to scratch the slider even when it comes into contact with the slider. Note that in other embodiments, the projection 204 may be made of any elastic material, and it may be a leaf spring made of a metal or a resin, for example.

(3-3: Elements Regarding Rail Member)

As shown in FIG. 14, the touch pen attachment 140 includes the rail member 143. The rail member 143 is an example slide portion capable of slidably engaging with the slider of the controller. The rail member 143 is provided on the engaging surface of the housing 141. In the present embodiment, as shown in FIG. 15, the rail member 143 is attached to the housing 141, together with the first member 141a and the second member 141b of the housing 141, by means of the three screws 155. Note that in other embodiments, the rail member 143 may be provided as an integral part of the housing 141. That is, a part of the housing 141 may serve as the rail member.

Figure 17:
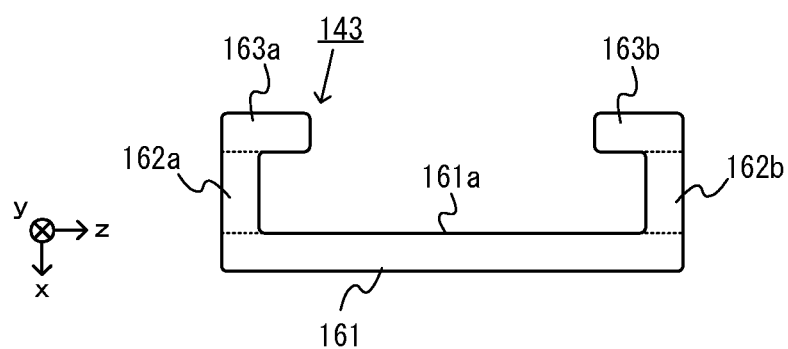
FIG. 17 schematically shows a non-limiting example rail member as seen from the slide direction.

FIG. 17 schematically shows an example rail member as seen from the slide direction. As shown in FIG. 17, the rail member 143 includes a bottom surface portion 161, side surface portions 162a and 162b and opposing portions 163a and 163b. Note that the side surface portions 162a and 162b may hereinafter be referred to collectively as "side surface portion 162". The opposing portions 163a and 163b may be referred to collectively as "opposing portion 163". In the present embodiment, the portions 161 to 163 are generally plate-shaped members.

As shown in FIG. 17, the bottom surface portion 161 is placed on the engaging surface of the housing 141 so as to be substantially parallel to the engaging surface. Note that "substantially (in a certain state)" as used herein means to include cases in which that state is achieved in a strict sense and also cases in which that state is generally achieved. For example, "substantially parallel" means that they may be parallel to each other in a strict sense, and they may not be parallel to each other in a strict sense but may be generally parallel to each other.

The bottom surface portion 161 includes a bottom surface 161a of the rail member 143. As shown in FIG. 17, the side surface portion 162 includes side surfaces substantially perpendicular to the bottom surface 161a. The side surface portion 162 extends, substantially perpendicular to the bottom surface portion 161, from opposite ends of the bottom surface portion 161 with respect to the width direction (i.e., the z-axis direction). Specifically, a side surface portion 162a extends from one end (i.e., on the z-axis negative direction side) of the bottom surface portion 161, and a side surface portion 162b extends from the other end (i.e., on the z-axis positive direction side) of the bottom surface portion 161. As shown in FIG. 17, the bottom surface portion 161 and the side surface portion 162 together form a groove.

As shown in FIG. 17, the opposing portion 163 is provided to extend from each of the two side surfaces of the side surface portion 162, and includes a surface that opposes the bottom surface 161a. The opposing portion 163 extends in a direction substantially parallel to the bottom surface 161a from an end (i.e., an end on the x-axis negative direction side) of the side surface portion 162 that is opposite to the end at which the bottom surface portion 161 is connected to the side surface portion 162. Specifically, the opposing portion 163a extends from an end portion of the side surface portion 162a on the x-axis negative direction side, and the opposing portion 163b extends from an end portion of the side surface portion 162b on the x-axis negative direction side. The opposing portions 163a and 163b are provided so as to protrude from the side surface portion 162 toward the inside of the rail member 143 (in other words, so as to protrude toward each other). The opposing portion 163a and the opposing portion 163b are spaced apart from each other so that the slider of the controller can be inserted into the groove formed by the bottom surface portion 161 and the side surface portion 162 (FIG. 17).

Figure 18:
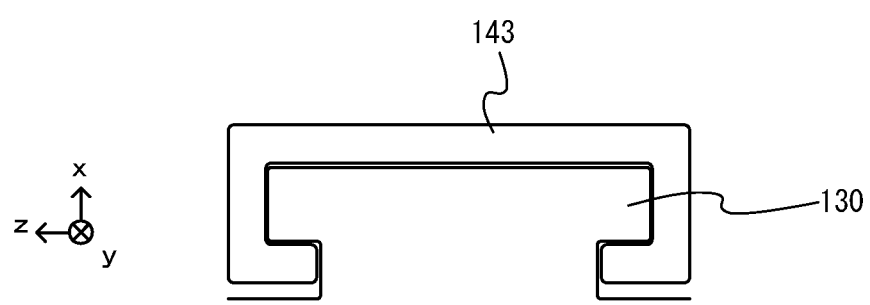
FIG. 18 schematically shows an example state in which a slider of a non-limiting controller is in engagement with a rail member of a non-limiting touch pen attachment.

FIG. 18 schematically shows an example state in which the slider of the controller is in engagement with the rail member of the touch pen attachment. FIG. 18 schematically shows a state in which the slider 130 of the right controller 4 is in engagement with the rail member 143 of the touch pen attachment 140. When the touch pen attachment 140 is attached to the right controller 4, the slider 130 of the right controller 4 is inserted into the groove of the rail member 143, thereby achieving a state in which the rail member 143 and the slider 130 are engaged with each other as shown in FIG. 18. In this state, the slider 130 in engagement with the rail member 143 is allowed to slide in the slide direction (i.e., the y-axis direction) while being secured by the opposing portion 163 so as not to come off in the direction (i.e., the x-axis direction) perpendicular to the slide direction.

As shown in FIG. 15, the lower end (i.e., the end on the y-axis negative direction side) of the rail member 143 is open so that the slider of the controller can be inserted. On the other hand, a stopper portion 144 is provided on the upper end side (i.e., the y-axis positive direction side) of the rail member 143. The stopper portion 144 is provided for the purpose of limiting the movement of the slider, which is inserted from the lower end of the rail member 143, in the insertion direction (i.e., the y-axis positive direction). That is, the slider, which is inserted from the lower end of the rail member 143, comes into contact with the stopper portion 144, to stop sliding in the insertion direction. The "state in which the touch pen attachment 140 is attached to the controller (referred to as the attached state)" as used herein is the state in which the slide movement of the slider is substantially limited by the stopper portion 144. Note that in addition to the state in which the slider is in contact with the stopper portion 144, the attached state also includes a state in which the slider and the stopper portion 144 are not in contact with each other in a strict sense but the slider cannot substantially move in the insertion direction (because there is substantially no gap between the slider and the stopper portion 144).

In the present embodiment, the stopper portion 144 is provided as an integral part of the second member 141b of the housing 141. Note that in other embodiments, the stopper portion 144 may be provided as an integral part of the rail member 143, or the stopper portion 144 may be separate from the housing 141 and the rail member 143.

There is no particular limitation on the arrangement of the stopper portion 144. The stopper portion 144 is provided near one end portion of the rail member 143 in the slide direction, and it may be provided on the outside (the upper side in the present embodiment) of the end portion of the rail member 143, or may be provided on the inside of the rail member 143 (e.g., in the upper end portion of the rail member 143). Note that in the present embodiment, since the stopper portion 144 is provided near the upper end portion of the rail member 143, the touch pen attachment 140 is attached to the controller by attaching the lower side thereof to (the upper side of) the controller (see FIG. 10).

As described above, in the present embodiment, the touch pen attachment 140 includes the stopper portion 144 provided near the upper end portion of the rail member 143 configured to limit the slide movement, in the insertion direction, of the slider which is inserted from the lower side of the rail member 143. Thus, it is possible to limit the movement of the slider inserted into the rail member 143.

As described above, in the present embodiment, the touch pen attachment 140 includes, as the slide portion, the rail member 143 that extends along the slide direction. Then, when the slider of the controller is inserted into the rail member 143 of the touch pen attachment 140, it is easy to slide the touch pen attachment 140 (which can be said to be the slide movement of the controller).

Note that in other embodiments, the slide portion of the touch pen attachment 140 does not need to be a single member extending in the slide direction, but may include a plurality of members arranged along the slide direction. For example, the touch pen attachment 140 may include, instead of the rail member 143, a plurality of members having a similar cross-sectional shape (specifically, a cross-sectional shape taken along a plane perpendicular to the slide direction) to that of the rail member 143. In this case, the plurality of members are arranged along the slide direction. Also with such a plurality of members, the touch pen attachment 140 can slidably engage with the slider of the controller.

In the present embodiment, the rail member 143 is formed from metal. Then, it is possible to improve the mechanical strength of the rail member. It is also possible to improve the mechanical strength of the housing 141 itself, on which the rail member is provided. Note that in the present embodiment, the housing 141 is formed from a resin. In other embodiments, there is no particular limitation on the material of the rail member 143, and the rail member 143 may be formed from a resin (which may be a resin harder than that of the housing 141).

Figure 19:
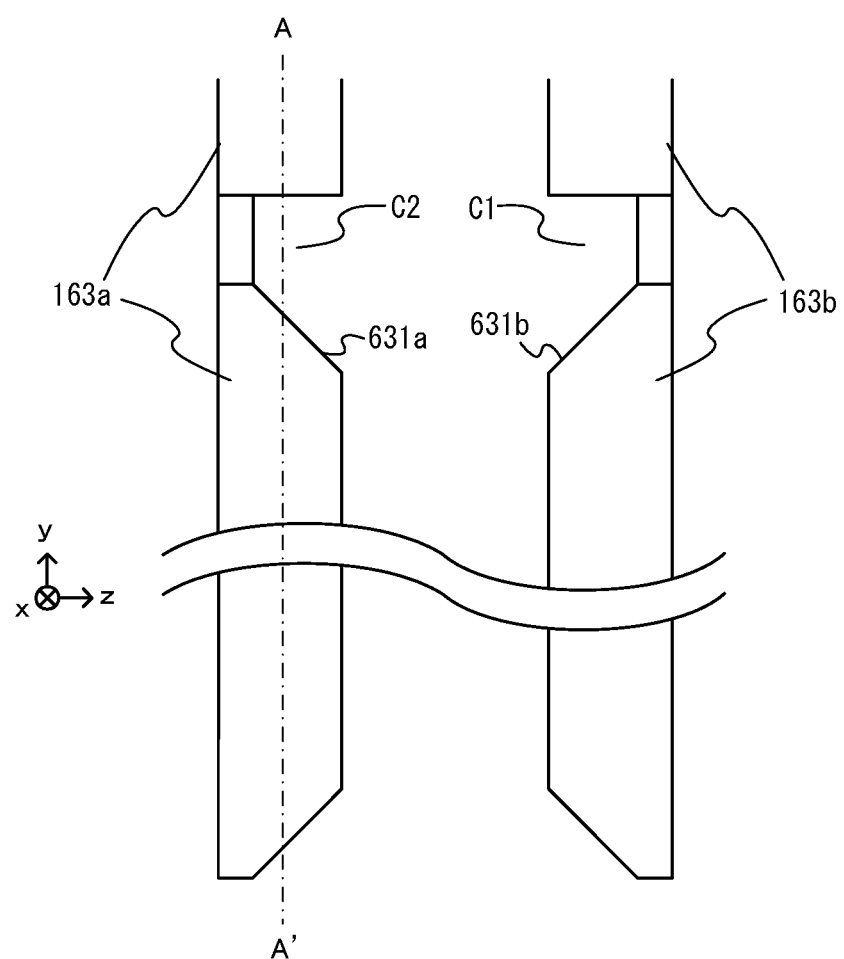
FIG. 19 schematically shows an example opposing portion of a non-limiting rail member.

FIG. 19 schematically shows an example opposing portion of the rail member. Note that FIG. 19 shows, on an enlarged scale, an upper end portion (i.e., an end portion on the y-axis positive direction side) and a lower end portion (i.e., an end portion on the y-axis negative direction side) of the opposing portion 163.

As shown in FIG. 19, in the present embodiment, the cut-out portions C1 and C2 are provided in a portion of the opposing portion 163. The cut-out portions C1 and C2 are provided so that the projection of the controller is not in contact with the opposing portion 163 (in other words, so as to allow the projection to be in the protruding state) in the attached state in which the touch pen attachment 140 is attached to the controller, the details of which will be described later. That is, the cut-out portions C1 and C2 are at positions corresponding to the projection of the controller in the attached state. Specifically, the cut-out portions C1 and C2 are in an upper end portion of the rail member 143 (see FIG. 19). Note that in the attached state, the projection of the controller engages with the cut-out portion of the opposing portion 163 (strictly speaking, the opposing portion 163 around the cut-out portion).

As shown in FIG. 19, the opposing portion 163 includes contact surfaces 631a and 631b in an area where the cut-out portions C1 and C2 are formed. In the attached state, a surface of the projection of the controller that is facing the lower side (i.e., the y-axis negative direction side) comes into contact with the contact surface. That is, the contact surface 631a is a surface with which the projection of the left controller 3 comes into contact when the left controller 3 and the touch pen attachment 140 are attached together. The contact surface 631b is a surface with which the projection 133 of the right controller 4 comes into contact when the right controller 4 and the touch pen attachment 140 are attached together.

In the present embodiment, the contact surfaces 631a and 631b are formed so that the gap between the two opposing portions 163a and 163b gradually narrows in the downward direction (i.e., toward the y-axis negative direction side) (see FIG. 19). The contact surfaces 631a and 631b are each part of the boundary of the gap between the two opposing portions 163a and 163b that gradually narrows toward the lower side. Then, when detaching the touch pen attachment 140 from the controller, the projection of the controller is unlikely interfered by the opposing portion 163. This allows a user to smoothly detach the touch pen attachment 140 from the controller.

As shown in FIG. 19, in the present embodiment, lower end portions of the two opposing portions 163a and 163b are tapered so that the gap therebetween gradually increases toward the distal end (in other words, in the downward direction). Then, when the slider of the controller is inserted into the lower end of the rail member 143, the projection of the controller is unlikely interfered by the opposing portion 163. This allows a user to smoothly attach the touch pen attachment 140 to the controller.

(Projection)

As shown in FIG. 14 and FIG. 15, the touch pen attachment 140 includes a projection 149. The projection 149 generally prevents the slide movement in the removal direction opposite to the insertion direction in the attached state in which the touch pen attachment 140 is attached to the controller, the details of which will be described later. With the projection 149, it is possible to reduce the possibility of the touch pen attachment 140 coming off the controller.

As shown in FIG. 15, the projection 149 includes projecting members 149a and a substrate 149b. The substrate 149b is a plate-shaped member and is provided on the inner side (i.e., on the x-axis positive direction side) of the rail member 143. The projecting members 149a are provided on the front side (i.e., the x-axis negative direction side) surface of the substrate 149b. In the present embodiment, two projecting members 149a are provided on both sides of the substrate 149b in the direction perpendicular to the slide direction (i.e., on the z-axis positive direction side and on the z-axis negative direction side). Note that as shown in FIG.

15, two holes 143*c* are provided on the bottom surface portion 161 of the rail member 143. The two projecting members 149*a* are provided so that the projecting members 149*a* can protrude respectively through the holes 143*c*. Thus, the projection 149 is provided so that a portion thereof can protrude through the bottom surface portion of the rail member 143.

Note that in other embodiments, the projection 149 (specifically, the projecting members 149*a*) may be provided so that it can protrude through the side surface portion 162 of the rail member or protrude through the opposing portion 163. Specifically, the projection 149 may be provided so as to protrude from the hole in one of the two side surface portions 162*a* and 162*b* toward the other one of the two side surface portions 162*a* and 162*b*. The projection 149 may be provided so as to protrude from the hole in one of the two opposing portions 163*a* and 163*b* toward the other one of the two opposing portions 163*a* and 163*b*. The projection 149 may be provided so as to protrude from the hole in the opposing portion 163 toward the bottom surface portion 161.

As shown in FIG. 14 and FIG. 15, the projection 149 is provided in a lower end portion (i.e., a portion on the y-axis negative direction side) of the rail member 143. Specifically, the projection 149 is provided at a position such that the projecting members 49*a* can engage with the lower end (i.e., the end portion on the y-axis negative direction side) of the slider (specifically, the top surface portion 132) of the controller in the attached state (see FIG. 20(*c*)). Note that in other embodiments, there is no particular limitation on the position (strictly speaking, the position of the controller) at which the projection 149 engages with the controller in the attached state. For example, when the projection 149 engages at a position along the slider other than the lower end thereof, the projection 149 does not need to be provided in a lower end portion of the rail member 143.

Figure 20:
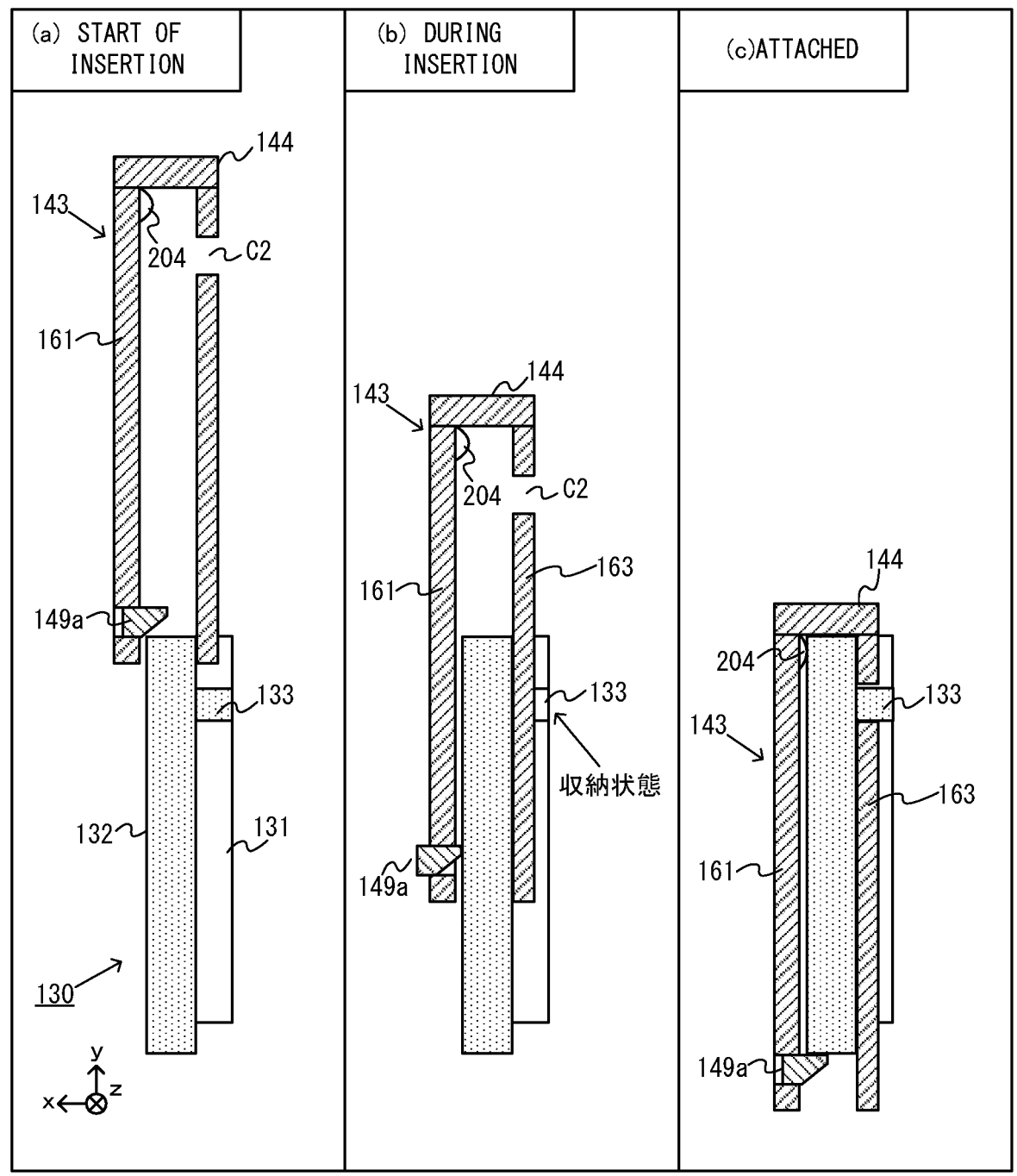
FIG. 20 schematically shows an example operation of connecting together a non-limiting slider and a non-limiting rail member.

In the present embodiment, the projection 149 is configured so that the projection 149 can move between the first position and the second position (see FIG. 20). The first position is a position where the projecting members 149*a* are more protruding than at the second position. That is, the projection 149 at the first position is more protruding, than the projection 149 at the second position, from the bottom surface of the rail member 143 where the projection 149 is provided. As will be described later, when the projection 149 is at the first position, the projection 149 engages with the slider of the controller in the attached state. When the projection 149 is at the second position, the projection 149 does not engage (or not substantially engage) with the slider of the controller in the attached state. At the second position, the projecting members 149*a* may be retracted inside the holes 143*c* of the bottom surface of the rail member 143, or the projecting members 149*a* may be slightly protruding from the bottom surface.

In the present embodiment, the projection 149 is biased by an elastic part into the protruding state at the first position. Specifically, the projection 149 is biased by a spring 150, which is an example elastic part (see FIG. 15). As shown in FIG. 15, the spring 150 is provided on the reverse side (i.e., the x-axis positive direction side) of the substrate 149*b*. The spring 150 is arranged inside the housing 141. By means of the spring 150, the projection 149 is biased to protrude from the bottom surface portion 161.

The projection 149 (specifically, the projecting members 149*a*) is provided so that a surface thereof on the insertion side (i.e., the y-axis negative direction side) is sloped (see FIG. 20). Note that this surface will be referred to hereinafter as the "slope". Specifically, the projection 149 may be sloped so that the height of the surface relative to the insertion side gradually decreases toward the insertion side. Then, when the slider of controller is inserted into the rail member 143, the projection is unlikely interfered by the slider, thereby enabling smooth slide movement.

(Attachment Operation)

Next, referring to FIG. 20, the operation of attaching the touch pen attachment 140 to the controller will be described using, as an example, the operation of attaching the touch pen attachment 140 to the right controller 4. FIG. 20 schematically shows an example operation of connecting together a slider and a rail member. FIG. 20 is a cross-sectional view taken along line A-A' of FIG. 19, showing the slider 11 and the rail member 143.

FIG. 20(*a*) shows a state immediately after the slider 130 starts to be inserted into the rail member 143. As shown in FIG. 20(*a*), in order to attach the touch pen attachment 140 to the right controller 4, the upper end of the slider 130 is first inserted into the lower end side (i.e., the y-axis negative direction side) of the rail member 143. Note that the projection 133 of the right controller 4 is at this point in the protruding state. At this point, the projecting member 149*a* of the projection 149 is not in contact with the slider 130, and it is biased by the spring 150 into the first position described above (i.e., the state in which it is protruding from the bottom surface portion 161 of the rail member 143).

When the touch pen attachment 140 is attached to the right controller 4, the slider 130 is slid from the position shown in FIG. 20(*a*) in the insertion direction (i.e., the direction in which the slider 130 moves toward the stopper portion 144 at the end of the rail member 143). As described above, the lower end portions of the opposing portions 163 of the rail member 143 are tapered so that the gap therebetween gradually increases toward the distal end (see FIG. 19). Thus, when the projection 133 of the slider 130 comes into contact with the opposing portion 163 of the rail member 143, the projection 133 is unlikely interfered by the opposing portion 163.

FIG. 20(*b*) shows a state in which the slider 130 is inserted halfway through the rail member 143 (the attached state has not been reached). In this state, the projection 133 is in the retracted state, having come into contact with the opposing portion 163 of the rail member 143. In this state, the projecting member 149*a* has been moved into the second position by the slider 130. Note that as described above, the projecting member 149*a* has a slope. Therefore, when the slider 130 comes into contact with the projecting member 149*a*, the slider 130 first hits the slope, and the slider 130 is unlikely interfered by the projecting member 149*a*. As the slider 130 is further slid in the insertion direction from the position of FIG. 20(*b*), the right controller 4 and the touch pen attachment 140 come into the attached state.

FIG. 20(*c*) shows the attached state in which the touch pen attachment 140 is attached to the right controller 4. In the attached state, the projection 149 is no longer pressed by the slider 130, and the projecting members 149*a* are therefore in the first position, protruding from the bottom surface of the rail member 143 as shown in FIG. 20(*c*). Therefore, if one attempts to slide the slider 130 in the removal direction, the slider 130 hits the projection 149. Thus, in the present embodiment, it is possible with the projection 149 to generally prevent the slide movement of the slider 130 in the removal direction.

As described above, in the present embodiment, the projection 149 is biased by an elastic part (i.e., the spring 150) into the first position (in other words, a position at which the projection 149 generally prevents the slide movement of the slider of the controller). Then, in the attached state, the projection 149 in the protruding state can generally prevent the slide movement of the slider of the controller (see FIG. 20).

Note that when a certain force or more is applied in the attached state for sliding the slider in the removal direction, the projection 149 moves into the second position, thereby releasing the engagement. Thus, a user can remove the touch pen attachment 140 from the controller by a simple operation.

As described above, in the attached state, since the projection 133 is located at the position of the cut-out portion C2 of the opposing portion 163, the projection 133 is in the protruding state. Therefore, in the present embodiment, the touch pen attachment 140 does not apply an unnecessary force on the projection 133 while in the attached state.

Note that when one attempts to slide the slider 130 in the removal direction in the attached state, the projection 133 hits the opposing portion 163. Therefore, in the present embodiment, it can be said that the slide movement of the slider 130 in the removal direction is also generally prevented by the projection 133 and the opposing portion 163. Note that in the present embodiment, the contact surface 631 of the opposing portion 163 is provided so that the gap between the two opposing portions 163a and 163b gradually narrows in the downward direction (see FIG. 19). This limits the capability of the projection 133 and the opposing portion 163 of generally preventing the slide movement.

As shown in (c) of FIG. 20, in the attached state, the projection 204 is in contact with (it can also be said to be pressing) the slider of the controller. That is, in the attached state, the projection 204 applies a force, on the slider, in a direction away from the bottom surface of the rail member 143 (see FIG. 20). Therefore, with the projection 204, it is possible to reduce the looseness between the controller and the touch pen attachment 140, and it is possible to more firmly connect the controller and the touch pen attachment 140 together. Moreover, when the controller is vibrated by a vibrator (not shown), it is possible to reduce the noise ("chattering") produced by the vibration.

In the exemplary embodiment, the projection 204 is provided on a portion of the rail member 143 that is on the upper side (i.e., the y-axis positive direction side) relative to the center. More specifically, the projection 204 is provided on an upper end portion of the rail member 143. Then, it is possible to shorten the period of time over which the projection 204 is in contact with the slider when the slider is inserted into the rail member 143. Therefore, the user can smoothly slide the slider. Note that there is no limitation on the position of the projection 204, and it may be provided on a lower portion of the rail member 143 in other embodiments. The projection 204 may be provided on the side surface portion 162 or the opposing portion 163 of the rail member 143.

(3-4: Elements Regarding Strap)

As shown in FIG. 14 and FIG. 15, the touch pen attachment 140 includes the strap 147. The strap 147 is a cord-like member such as a cord or a rope, and has a loop shape. As described above, the strap 147 is put on the wrist when a user holds a touch-pen-attached controller device.

In the present embodiment, the strap 147 is fixedly fastened to the housing 141. Specifically, as shown in FIG. 15, a shaft portion 141h, threaded inside for receiving the screw 155, is provided inside the housing 141 (specifically, the first member 141a). As shown in FIG. 15, a hole 141i is provided in the housing 141 (specifically, the first member 141a). The strap 147 is hooked on the shaft portion 141h, extending out of the housing 141 through the hole 141i. Thus, in the present embodiment, the strap 147 can be fixedly fastened to the housing 141. According to the present embodiment, the strap 147 can be securely fastened to the housing 141.

Note that in other embodiments, the touch pen attachment 140 may be configured so that the strap is removably attachable to the touch pen attachment 140. That is, the touch pen attachment 140 may include a strap anchor to which a strap can be fastened, instead of a strap (or in addition to a strap). For example, the strap anchor may be provided on the housing 141 and may include a hole. Then, a strap can be attached by passing the strap through the hole. Note that in the present embodiment, the strap 147 is fastened to the shaft portion 141h, and the shaft portion 141h is therefore equivalent to the strap anchor.

In the present embodiment, the touch pen attachment 140 includes the strap 147 (or the strap anchor to which the strap 147 is fastened) on the lower side of the center of the touch pen attachment 140 (more specifically, in a lower end portion of the housing 141). In other words, the strap 147 is fastened on the opposite side from the stopper portion 144 in the slide direction of the rail member 143. That is, the touch pen attachment 140 is attached to the controller by first inserting the lower side (where the strap 147 is fastened) of the touch pen attachment 140 into the upper side of the controller (see FIG. 10).

Consider a situation in which a user is performing an operation by holding and shaking the touch-pen-attached controller device with the strap 147 put on the wrist. In this situation, when a user inadvertently lets go of the touch-pen-attached controller device, the touch pen attachment 140 stops moving because the strap 147 is on the wrist, whereas the controller is urged to continue moving. Thus, the controller is under a force urging the controller to move relative to the touch pen attachment 140. In the present embodiment, however, since the strap 147 is fastened on the opposite side from the stopper portion 144 in the slide direction, the above force urges the controller to move in the insertion direction.

As described above, by providing the strap 147 (or the strap anchor) on the opposite side from the stopper portion 144 in the slide direction of the rail member 143, it is possible to prevent the controller from moving in such a direction that the controller comes off the touch pen attachment 140.

As shown in FIG. 14, the strap 147 includes an adjustment 148 in the present embodiment. The adjustment 148 is a member used for adjusting the length of the loop of the cord-like member of the strap 147. Specifically, the adjustment 148 includes an adjustment button 148a. Although there is no particular limitation on the specific mechanism of the adjustment 148, in the present embodiment, the adjustment 148 can be moved easily on the cord-like member of the strap 147 while the adjustment button 148a is pressed, whereas the adjustment 148 can be fixed (in other words, can be made less movable) on the cord-like member of the strap 147 while the adjustment button 148a is not pressed. Thus, a user can adjust the length of the loop of the cord-like member by using the adjustment 148 so that the strap 147 will not slip off the wrist.

(3-5: Elements Regarding Buttons)

As shown in FIG. 14 and FIG. 15, the touch pen attachment 140 includes the first button 151 and the second button 152. These buttons 151 and 152 are provided so as to allow the second L button and the second R button of the controller to be operated when the touch pen attachment 140 is attached to the controller.

As shown in FIG. 14, the buttons 151 and 152 are provided so as to protrude from the button provision surface of the housing 141. The first button 151 is provided at a position on the button provision surface on the lower side of the center in the up-down direction (i.e., the y-axis direction). The second button 152 is provided at a position on the button provision surface on the upper side of the center in the up-down direction.

The buttons 151 and 152 are biased to protrude from the button provision surface. Specifically, as shown in FIG. 15, the first button 151 is biased by a spring 153 provided inside the housing 141, and the second button 152 is biased by a spring 154 provided inside the housing 141. When the button 151 or 152 is not pressed, the operation surface thereof (i.e., the surfaces on the x-axis positive direction side) is protruding from the button provision surface by a predetermined first distance. The button 151 or 152 can be pressed by a user up to such a position that the operation surface thereof is at a predetermined second distance (the second distance is shorter than the first distance) from the button provision surface.

As shown in FIG. 15, the first button 151 includes a first actuation portion 151a. The first actuation portion 151a is provided so as to protrude toward the opposite side from the operation surface of the first button 151. The first actuation portion 151a is configured so that it can move from a first operation position (FIG. 21(a)) to a second operation position (FIG. 21(b)) in response to the first button 151 being pressed. The second button 152 includes a second actuation portion 152a. The second actuation portion 152a is provided so as to protrude toward the opposite side from the operation surface of the second button 152. The first actuation portion 152a is configured so that it can move from a third operation position to a forth operation position in response to the second button 152 being pressed. Each of the actuation portions 151a and 152a is a rod-shaped member.

As shown in FIG. 15, holes 143a and 143b are provided running through the rail member 143 and the housing 141 (specifically, the second member 141b). The first actuation portion 151a is provided so that the first actuation portion 151a can protrude past the bottom surface of the rail member 143 through the hole 143a. The second actuation portion 152a is provided so that the second actuation portion 152a can protrude past the bottom surface of the rail member 143 through the hole 143b. The position at which the first actuation portion 151a protrudes from the bottom surface substantially corresponds to the second L button 65 of the right controller 4 (or the second R button of the left controller 3) in the attached state. That is, the position at which the first actuation portion 151a protrudes from the bottom surface is facing the position of the second L button 65 in the attached state, and is the same position as that of the second L button 65 in the attached state with respect to the up-down direction (i.e., the y-axis direction) and the front-rear direction (i.e., the z-axis direction). Similar to the first actuation portion 151a, the position at which the second actuation portion 152a protrudes from the bottom surface corresponds to the second R button 66 of the right controller 4 (or the second L button of the left controller 3) in the attached state.

Note that as shown in FIG. 15 (and FIG. 21 to be discussed later), the cross-sectional area of the actuation portion along the cross section perpendicular to the direction of protrusion (specifically, the cross-sectional area along the cross section parallel to the yz plane) is smaller than the area of the operation surface of the button on which the actuation portion is provided. Then, the holes 143a and 143b through which the actuation portions 151a and 152a pass can be made smaller than the operation surfaces of the buttons 151 and 152. In other words, it is possible to increase the size of the buttons 151 and 152 for easier operations without increasing the size of the holes 143a and 143b to be provided running through the rail member and/or the housing.

Figure 21:
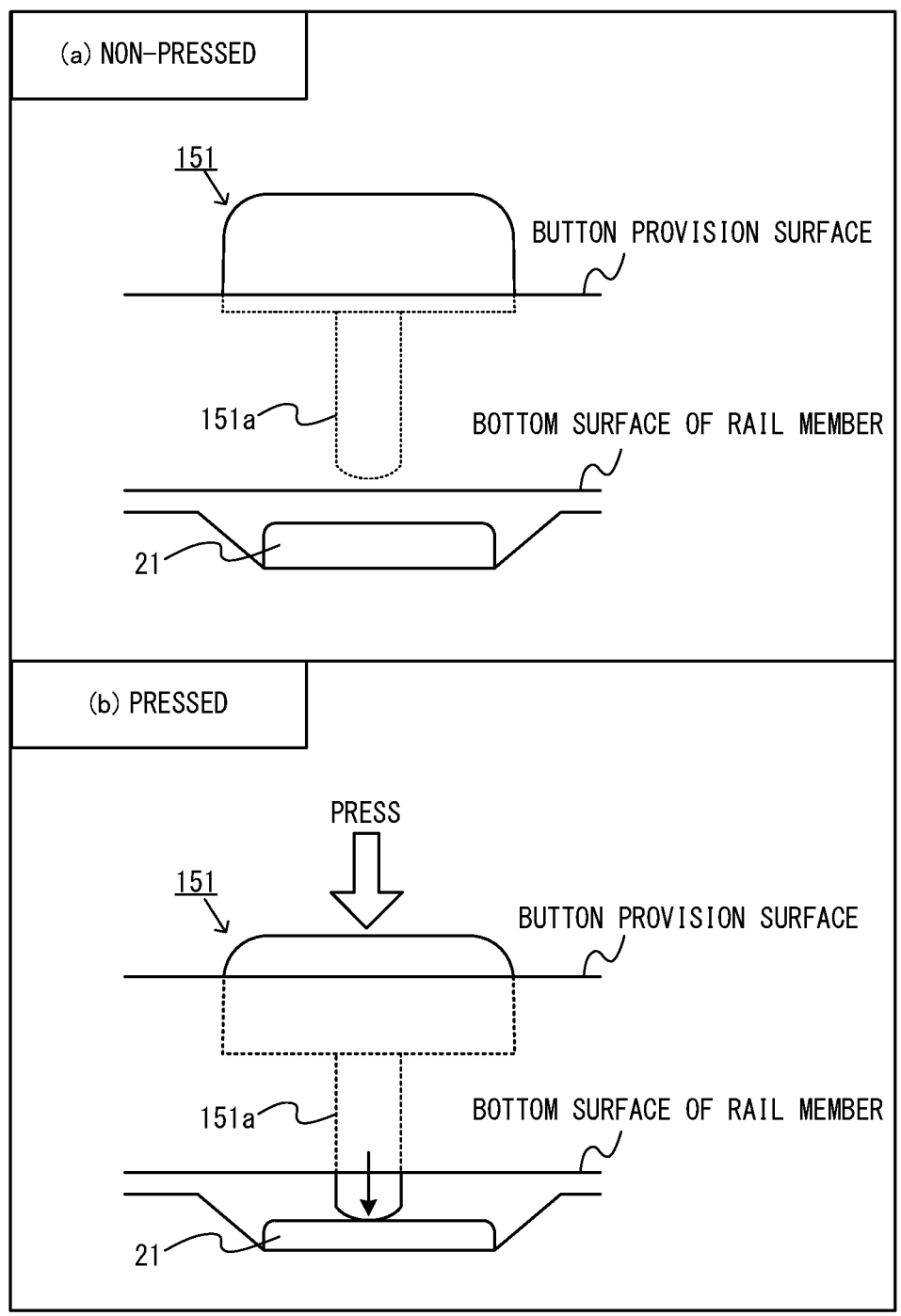
FIG. 21 schematically shows an example of how a button on a non-limiting controller is pressed by a button on a non-limiting touch pen attachment.

FIG. 21 schematically shows an example of how a button on the controller is pressed by a button on the touch pen attachment. Note that although FIG. 21 shows an example where the right controller 4 is attached to the touch pen attachment 140 and the second L button 65 is pressed by the first button 151, the above description holds true also for other cases (i.e., where the second R button of the left controller 3 is pressed by the first button 151, where the second L button of the left controller 3 is pressed by the second button 152, and where the second L button of the right controller 4 is pressed by the second button 152).

FIG. 21(a) shows a state in which the first button 151 is not pressed (non-pressed state). In the non-pressed state, the first actuation portion 151a is not protruding past the bottom surface of the rail member 143 but is retracted inside the housing 141. Therefore, the second L button 65 is not pressed by the first actuation portion 151a.

On the other hand, FIG. 21(b) shows a state in which the first button 151 is pressed (pressed state). In the pressed state, the first actuation portion 151a is protruding past the bottom surface of the rail member 143. Then, the first actuation portion 151a presses the second L button 65. That is, in the attached state, a user can press the first button 151, thereby in turn pressing the second L button 65.

As described above, in the present embodiment, even when the touch pen attachment 140 is attached to the controller, a user can press buttons provided on the touch pen attachment 140 to thereby operate the second L button and the second R button on the controller (which are hidden by the touch pen attachment 140).

Note that when a user holds the touch-pen-attached controller device using both hands, a user can operate the first button 151 and the second button 152 using the index finger and/or the middle finger, for example. That is, a user can operate the buttons 151 and 152 using the same fingers as those used when operating the second L button and the second R button when the touch pen attachment 140 is not attached.

In the present embodiment, the area of the operation surface of a button on the touch pen attachment 140 (i.e., the first button 151 or the second button 152) is greater than the area of the operation surface of a button on the controller (i.e., the second L button or the second R button). Therefore, in the present embodiment, it is easier for a user to press a button on the touch pen attachment 140 attached to the controller than to directly press a button on the controller. That is, it is possible to improve the controllability of the controller by attaching the touch pen attachment 140 to the controller.

Note that in the present embodiment, the pairing button provided on the slider of the controller cannot be operated by a user when the touch pen attachment 140 is attached to the controller. This is because it is assumed that the pairing button is a button used when instructing a process regarding the wireless communication between the controller and the main unit 2 and that the pairing button is not used while operating the controller (e.g., during game operations). Note that in other embodiments, a button corresponding to the pairing button may be provided on the touch pen attachment 140 so as to allow the pairing button to be operated in the attached state.

Figure 22:
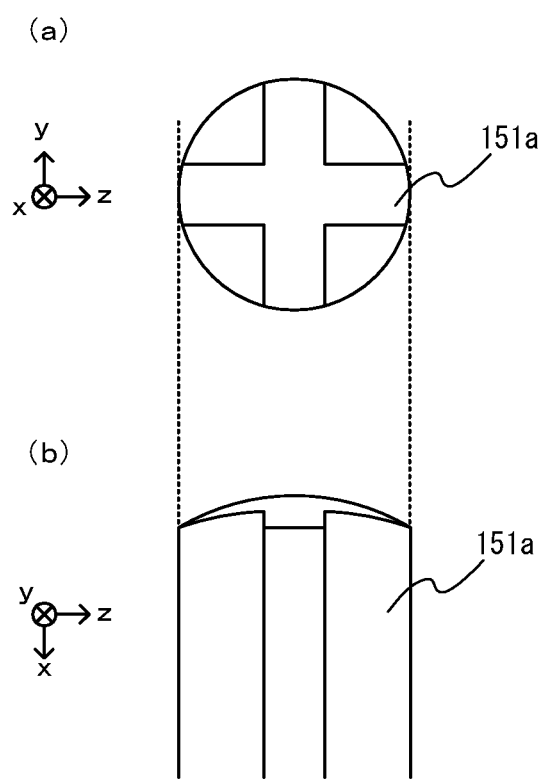
FIG. 22 shows a non-limiting example actuation portion.

FIG. 22 shows an example actuation portion. Note that while FIG. 22 shows the first actuation portion 151*a* shown in FIG. 15, the second actuation portion 152*a* has a similar shape to the first actuation portion 151*a*.

FIG. 22(*a*) shows the first actuation portion 151*a* as seen from the direction of protrusion (i.e., from the x-axis negative direction side). As shown in FIG. 22(*a*), the first actuation portion 151*a* has a cross-shaped cross section along a plane perpendicular to the direction of protrusion. Then, it is possible to reduce the volume of the actuation portion 151*a* while maintaining the mechanical strength thereof. Note that in other embodiments, the first actuation portion 151*a* may have a cylindrical shape or a columnar shape, for example.

FIG. 22(*b*) shows the first actuation portion 151*a* as seen from a direction perpendicular to the direction of protrusion (i.e., from the y-axis negative direction side). As shown in FIG. 22(*b*), the tip of the first actuation portion 151*a* has a curved surface (specifically, a curved surface such that the center thereof is protruding). Then, when a button on the controller is pressed by the actuation portion 151*a*, it is possible to reduce the possibility that the button on the controller is damaged by the actuation portion 151*a*.

(3-6: Elements Regarding Lightguide)

The touch pen attachment 140 includes elements for allowing a user to see the light from the indicator LEDs of the controller attached thereto. The indicator LED of each of the controllers 3 and 4 may be lit to indicate the number assigned to the controller, or may be lit to indicate the remaining battery level of the controller. In such a case, with the elements described above, a user can see the light from the indicator LED of the controller even if the touch pen attachment 140 is attached to the controller. This will be described below in detail.

As shown in FIG. 14, light-receiving ports 156 (i.e., holes in which the light-receiving surfaces of a lightguide member 158 shown in FIG. 15 are provided) are provided on the bottom surface of the rail member 143 (and the engaging surface of the housing 141). The number of the light-receiving ports 156 is equal to the number (herein, four) of indicator LEDs of the controller. The light-receiving ports 156 are provided at positions corresponding to the indicator LEDs of the controller attached to the touch pen attachment 140. That is, the positions of the light-receiving ports 156 are substantially opposing the positions of the indicator LEDs in the attached state, and are more specifically the same positions as those of the indicator LEDs in the attached state with respect to the up-down direction (i.e., the y-axis direction) and the front-rear direction (i.e., the z-axis direction).

As shown in FIG. 14, light-exiting ports 157 (i.e., holes in which light-exiting surfaces of the lightguide member 158 are provided) are provided on the housing 141. The light-exiting ports correspond to four light-receiving ports, and the number of light-exiting ports is equal to the number (herein, four) of the light-receiving ports. In the present embodiment, the light-exiting ports 157 are provided on the button provision surface of the housing 141 (see FIG. 14). More specifically, the light-exiting ports 157 are provided between the first button 151 and the second button 152. Note that in other embodiments, the light-exiting ports 157 may be provided on any surface that is different from the bottom surface (in other words, the engaging surface) of the rail member 143. For example, in other embodiments, the light-exiting ports 157 may be provided on the front surface or the rear surface of the housing 141.

As shown in FIG. 15, the touch pen attachment 140 includes the lightguide member 158 inside the housing 141. The lightguide member 158 is a transparent member (specifically, a lens) formed from a resin, for example. The lightguide member 158 includes a number of lenses equal to the number (herein, four) of the light-receiving ports 156 and the light-exiting ports 157. In the present embodiment, for easier production, the lightguide member 158 is an integrally-molded piece including four lenses connected together. Note however that in other embodiments, the lenses may be provided as separate pieces. As shown in FIG. 15, the lenses of the lightguide member 158 are arranged so that the light-receiving surfaces (i.e., surfaces on the x-axis negative direction side) are in the vicinity of the light-receiving ports 156, respectively, and the light-exiting surfaces (i.e., surfaces on the x-axis positive direction side) are in the vicinity of the light-exiting ports 157, respectively.

Note that in the present embodiment, the light-receiving surfaces of the lightguide member 158 are provided at positions sunken from the bottom surface of the rail member 143 (in other words, at positions that are closer to the center of the housing 141). Then, it is possible to reduce the possibility that the lightguide member 158 comes into contact with the controller when inserting the slider of the controller into the rail member 143, thereby allowing the touch pen attachment 140 to be smoothly attached to the controller.

Figure 23:
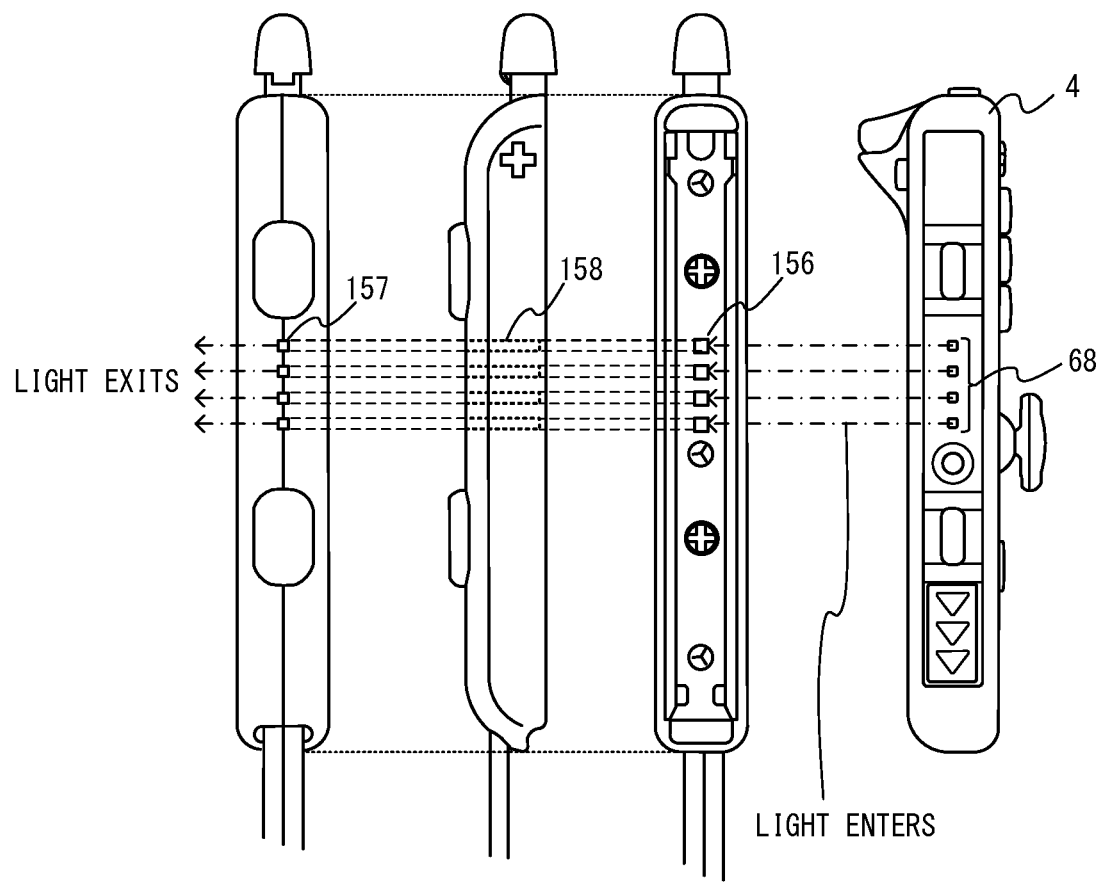
FIG. 23 shows an example of how light from indicator LEDs of a non-limiting controller exits light-exiting ports of a non-limiting touch pen attachment.

FIG. 23 shows an example of how light from the indicator LEDs of the controller exits the light-exiting ports of the touch pen attachment. For example, when an indicator LED 68 emits light with the touch pen attachment 140 attached to the right controller 4, the light from the indicator LED 68 enters the light-receiving surface of the lightguide member 158 through the light-receiving port 156 opposing the LED 68 that is lit. The lightguide member 158 guides light incident upon the light-receiving surface to the light-exiting surface by virtue of internal reflection, and the light exits the light-exiting surface. Thus, light is output from the light-exiting port 157.

Note that in other embodiments, the lightguide member 158 may be any member capable of guiding light incident upon the light-receiving port 156 to the light-exiting port 157. For example, in other embodiments, the lightguide member may be a mirror provided on the wall of the holes connecting between the light-receiving ports 156 and the light-exiting ports 157.

As described above, in the present embodiment, the touch pen attachment 140 includes a lightguide portion (herein, the lightguide member 158) for guiding light incident on a light-receiving port 156 provided on the bottom surface of the rail member 143 to a light-exiting port provided on a surface (herein, the button provision surface) different from the bottom surface. Then, even when the touch pen attachment 140 is attached to the controller, the light from an indicator LED of the controller can be presented to a user, as when the touch pen attachment 140 is not attached to the controller. By the provision of the lightguide portion, it is possible to present to a user information indicated by the indicator LEDs of the controller to which the touch pen attachment 140 is attached using a simple configuration (e.g., as compared with an embodiment in which the touch pen attachment 140 receives information regarding indicator LEDs from the controller so as to control indicator LEDs of the touch pen attachment 140 based on the received information).

Note that in the present embodiment, the light-exiting ports 157 are provided on the button provision surface of the housing 141 (see FIG. 14). Then, the orientation of the light-exiting ports of the touch pen attachment 140 attached to the controller is the same as the orientation of the indicator LEDs of the controller, and it is therefore possible to present light from the light-exiting ports in such a manner that the light is easy for a user to see.

In the present embodiment, the light-exiting ports 157 are provided on the button provision surface between the first button 151 and the second button 152 (see FIG. 14). Then, the positional relationship between the two buttons 151 and 152 and the light-exiting ports 157 on the touch pen attachment 140 can be made the same as the positional relationship between two buttons (i.e., the second L button and the second R button) and the indicator LEDs on the controller. Then, a user can operate the controller in the same fashion whether or not the touch pen attachment 140 is attached to the controller, thus improving the controllability of the controller when the touch pen attachment 140 is attached thereto.

In the present embodiment, light from a plurality of indicator LEDs of the controller is output from a plurality of light-exiting ports 157 corresponding respectively to the indicator LEDs. Therefore, in the present embodiment, a user can recognize which one or ones of the indicator LEDs are lit.

Note that in other embodiments, the touch pen attachment 140 may include one light-receiving port and one light-exiting port even though the controller includes a plurality of indicator LEDs. Then, when any of the indicator LEDs of the controller is lit, light is output from the light-exiting port of the touch pen attachment 140. Then, although it is not possible to indicate which one of the indicator LEDs of the controller is lit, it is possible to indicate to a user that at least one of the indicator LEDs is lit. Depending on the content of information to be indicated by indicator LEDs to a user, this configuration may suffice.

Note that in other embodiments, partitions may be provided between a plurality of light-receiving ports (in other words, a plurality of light-receiving surfaces) arranged next to each other. Then, it is possible to reduce the possibility that light from one indicator LED is incident upon another light-receiving port that is different from the corresponding light-receiving port, and it is possible to reduce the possibility that light is output from a light-exiting surface that does not correspond to the indicator LED that is lit.

[4. Example Game Process Based on Touch Input]

Next, an example game process using the touch-pen-attached controller device described above will be described with reference to FIG. 24 to FIG. 27. In the exemplary embodiment, the main body apparatus 2 executes game processes based on a touch input made on the touch panel 13.

(4-1: First Game Process)

Figure 24:
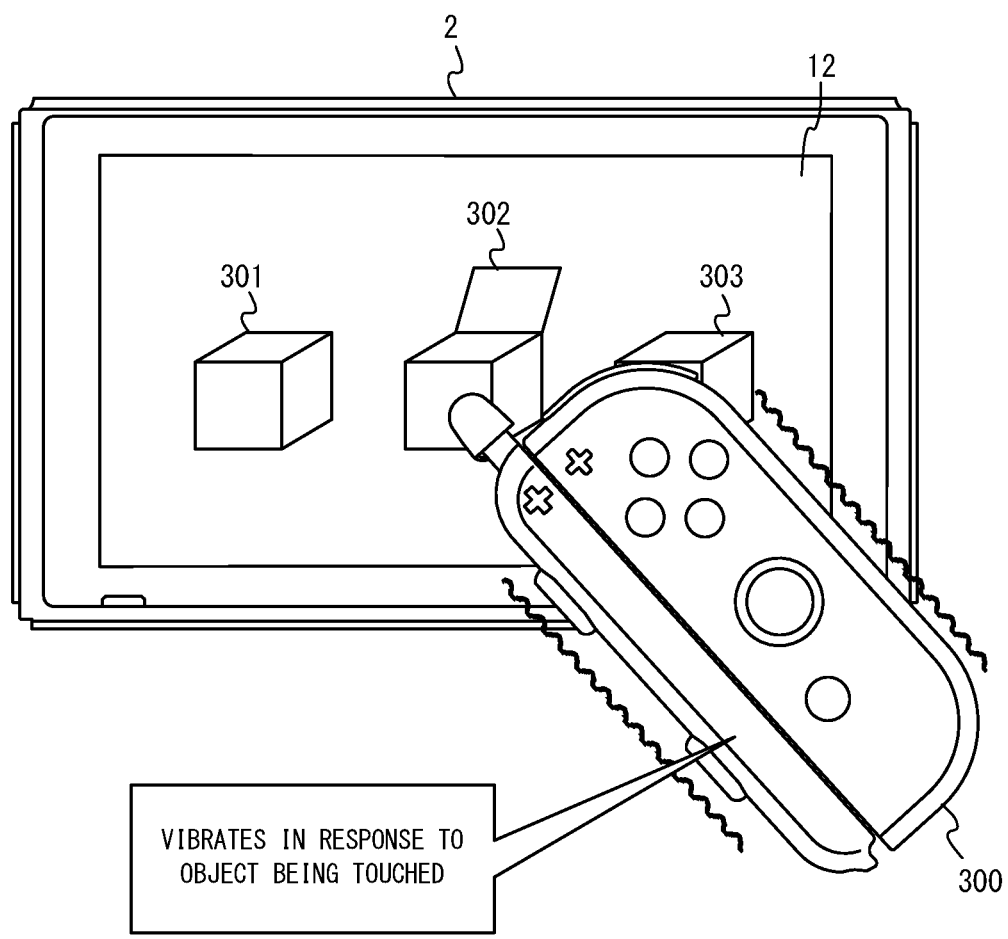
FIG. 24 shows an example game operation in a non-limiting first game process.
Figure 25:
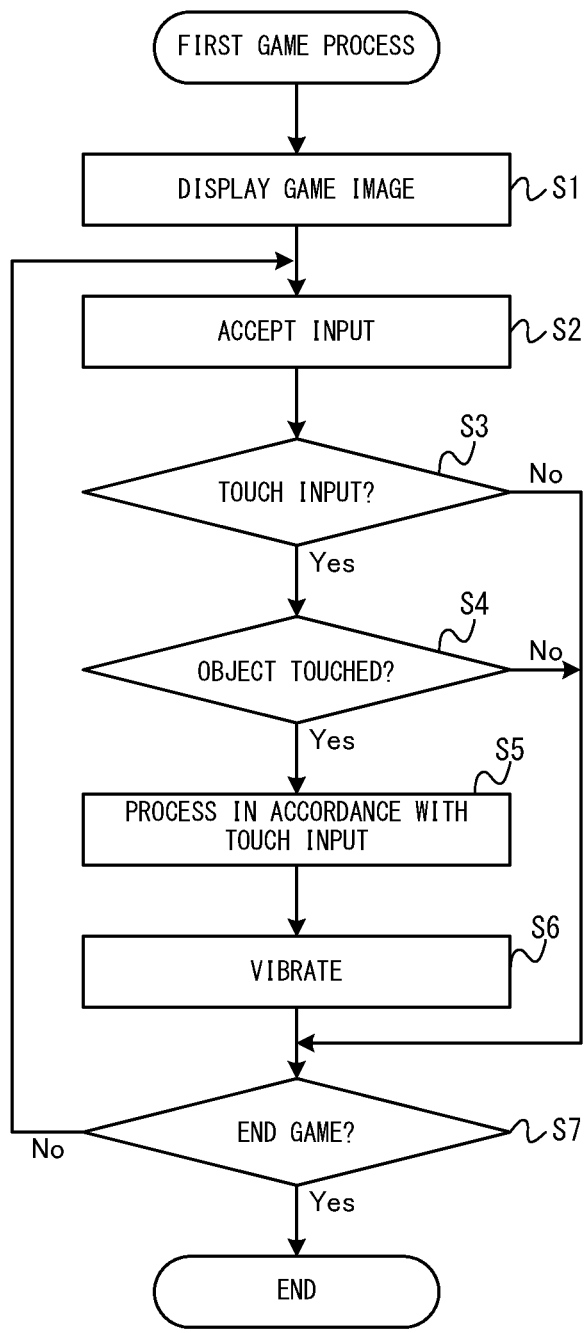
FIG. 25 is a flow chart showing an example flow of a first game process executed by a non-limiting game system.

Referring to FIG. 24 and FIG. 25, a first game process will be described. In the first game process, the main body apparatus 2 vibrates the touch-pen-attached controller device in response to a touch input that is made using the touch-pen-attached controller device. The details of the first game process will now be described.

FIG. 24 shows an example game operation in the first game process. As shown in FIG. 24, in the first game process, box objects 301 to 303 are displayed on the display 12 as example virtual objects (referred to also as game objects) to be touched. In the first game process, an item is associated with each of the box objects 301 to 303. A user (in other words, a player) gives, by a touch input, an instruction to select one of the box objects 301 to 303. In the first game process, an item that is associated with the selected box object is awarded to a user (or a player character to be operated by the user).

In the first game process, the instruction to select one of the box objects 301 to 303 is given by a touch input of touching the position of the box object. Herein, when a touch input is made on one of the box objects 301 to 303, the main body apparatus 2 vibrates a touch-pen-attached controller device 300 that has been used to make the touch input. That is, the main body apparatus 2 vibrates the controller (the right controller 4 in the example shown in FIG. 24) included in the touch-pen-attached controller device 300.

In the first game process, the main body apparatus 2 vibrates the touch-pen-attached controller device 300 in a different manner for each box object selected. Note that where each of the box objects 301 to 303 is assigned as a win or a loss, the main body apparatus 2 may vibrate the touch-pen-attached controller device 300 in different manners between winning box objects and losing box objects. The main body apparatus 2 may vibrate the touch-pen-attached controller device 300 in a different manner for each item that is associated with the box object.

FIG. 25 is a flow chart showing an example flow of the first game process executed by the game system 1. Note that a series of game processes shown in FIG. 25 are started in response to the start of a game program for executing the first game process.

Note that in the exemplary embodiment, it is assumed that the processes of the steps shown in FIG. 25 (this similarly applies also to FIG. 27 to be discussed later) are executed by the processor 81 of the main body apparatus 2 executing the game program stored in the game system 1. Note however that in other embodiments, some of the processes of the steps may be executed by a processor different from the processor 81 (e.g., a dedicated circuit, etc.). Where the game system 1 can communicate with another information processing apparatus (e.g., a server), some of the processes of the steps shown in FIG. 25 and FIG. 27 may be executed on the other information processing apparatus. The processes of the steps shown in FIG. 25 and FIG. 27 are merely illustrative, and the order of steps may be switched around, and other processes may be executed in addition to (or instead of) the process of any step, as long as similar results are obtained.

Figure 27:
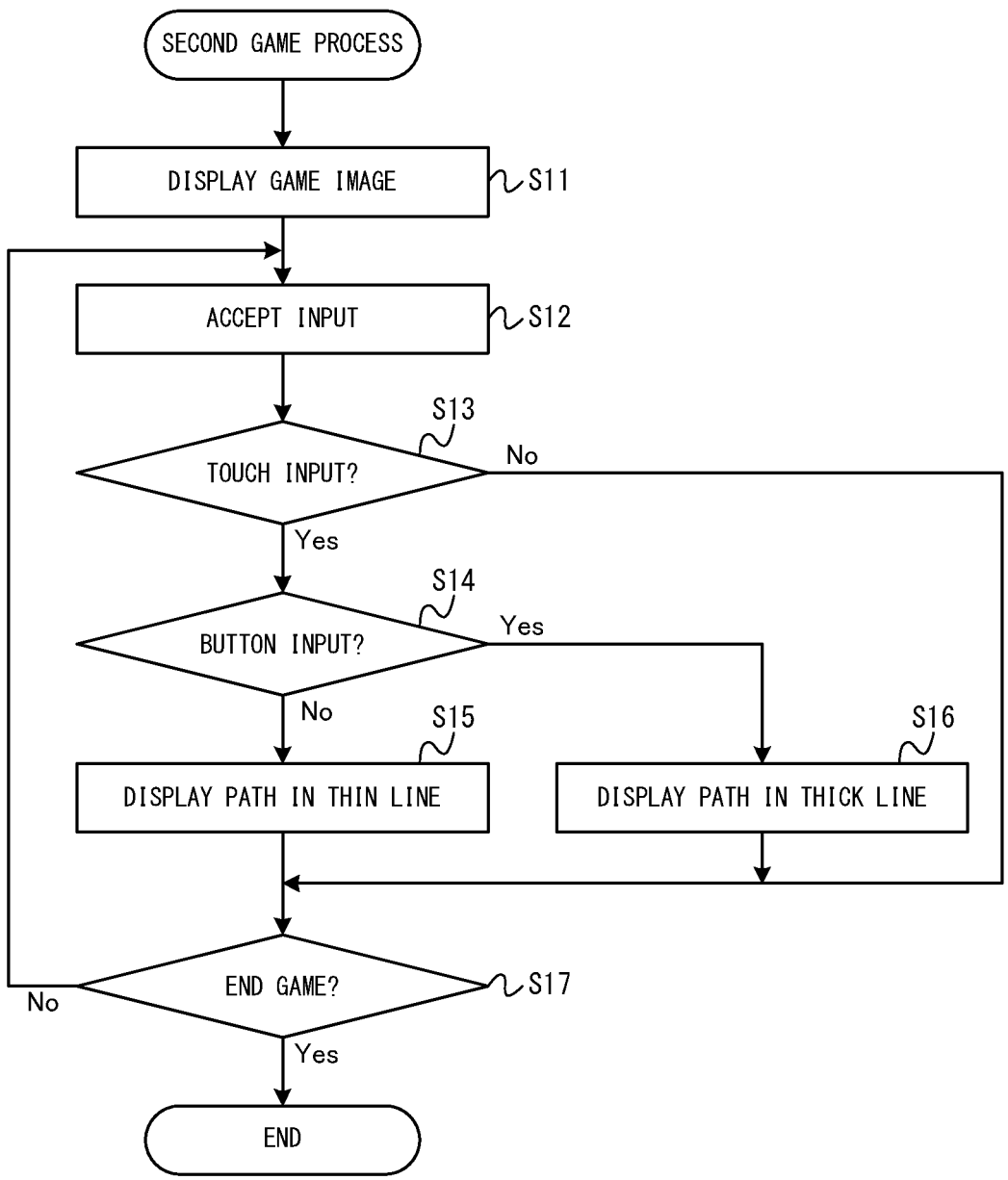
FIG. 27 is a flow chart showing an example flow of a second game process executed by a non-limiting game system.

The processor 81 executes the processes of the steps shown in FIG. 25 and FIG. 27 by using a memory (e.g., the DRAM 85). That is, the processor 81 stores information (in other words, data) obtained in each process step in a memory, and when this information is used in a subsequent process step, the information is read out from the memory and used.

In step S1, the processor 81 displays a game image on the display 12. Specifically, the processor 81 generates a game image, and displays the generated game image on the display 12. In the first game process, a game image including the box objects 301 to 303 is generated and displayed. The process of step S2 is executed, following step S1.

In step S2, the processor 81 accepts an input by a user. That is, from input sections (including the touch panel 13) provided on the main body apparatus 2, the processor 81 obtains data representing inputs made on the input sections. The processor 81 obtains operation data received from the controller via the controller communication section 83. The processor 81 stores obtained data in the memory. The process of step S3 is executed, following step S2.

In step S3, based on the data obtained in step S2, the processor 81 determines whether or not a touch input has been made on the touch panel 13. When the determination result of step S3 is affirmative, the process of step S4 is executed. On the other hand, when the determination result of step S3 is negative, the process of step S7 to be described below is executed.

In step S4, the processor 81 determines whether or not a touch input has been made on an object displayed on the display 12 (herein, the box objects 301 to 303). That is, the processor 81 determines whether or not the position of the touch input represented by the data obtained in step S2 is within any of the areas of the box objects 301 to 303 on the display 12. When the determination result of step S4 is affirmative, the process of step S5 is executed. On the other hand, when the determination result of step S4 is negative, the process of step S7 to be described below is executed.

In step S5, the processor 81 executes an information process in accordance with the touch input. The information process in step S5 may be of any content. In the first game process, the processor 81 updates the game image displayed on the display 12 so that the selected box object (i.e., the box object on which the touch input has been made) opens. The processor 81 executes the process of awarding a user with an item that is associated with the selected box object. The process of step S6 is executed, following step S5.

In step S6, the processor 81 vibrates the controller included in the touch-pen-attached controller device. That is, the processor 81 transmits, to each controller, a vibration instruction for vibrating the vibrator of the controller via the controller communication section 83. In the first game process, the vibration instruction represents the manner of vibration that is associated with the selected box object. Note that the relationship between each box object and the manner of vibration to be used when the box object is selected is prescribed in the game program. The processor 81 determines the manner of vibration based on information that represents the relationship. In the controller having received the vibration instruction, the communication control section drives the vibrator in accordance with the received vibration instruction. Thus, the touch-pen-attached controller device is vibrated. Note that the processor 81 may vibrate the controller while the touch input is being made on the object, or may vibrate the controller until elapse of a predetermined amount of time since the start of the touch input on the object.

Note that in the first game process, the controller used for a touch input (i.e., a controller to which the touch pen attachment 140 is attached) is pre-identified by the main body apparatus 2. For example, the main body apparatus 2 accepts an instruction input that specifies the controller to be used to make touch inputs before the start of the first game process, and specifies the controller to be used to make touch inputs based on this instruction input from the user. In step S6 described above, the processor 81 transmits the vibration instruction to the specified controller. The process of step S7 is executed, following step S6.

In step S7, the processor 81 determines whether or not to end the game process. For example, when an instruction to end the game is given by a user, the processor 81 determines to end the game process. When the determination result of step S7 is negative, the process of step S2 described above is executed again. The series of processes of steps S2 to S7 described above are executed repeatedly until the result of the determination process of step S7 is affirmative. On the other hand, when the determination result of step S7 is affirmative, the processor 81 ends the first game process.

As described above, in the first game process, the main body apparatus 2 transmits a vibration instruction to the controller, to which the touch pen attachment 140 is attached, based on an input that is made on the touch panel 13 using the touch pen portion 200 of the touch pen attachment 140 (step S6). The controller receives the vibration instruction and vibrates the vibrator in accordance with the received vibration instruction. Thus, with the first game process, the touch-pen-attached controller device 300 vibrates in response to a predetermined touch input made by using the touch-pen-attached controller device 300. Therefore, in the game system 1, a user can recognize the detection of a touch input in an easy-to-understand manner.

With the first game process, the manner in which the touch-pen-attached controller device vibrates varies depending on the content of a touch input (specifically, depending on the object on which the touch input has been made). Then, a user can recognize the content of the touch input in an easy-to-understand manner. Moreover, by vibrating the touch-pen-attached controller device in such a manner that matches the content of a touch input, it is possible to improve the playability of game operations based on touch inputs.

Note that there is no limitation on the content of the touch input for vibrating the controller. For example, in other embodiments, the main body apparatus 2 may vibrate the controller in response to a predetermined touch input (e.g., a predetermined gesture input) made on the touch panel 13.

(4-2: Example Second Game Process)

Figure 26:
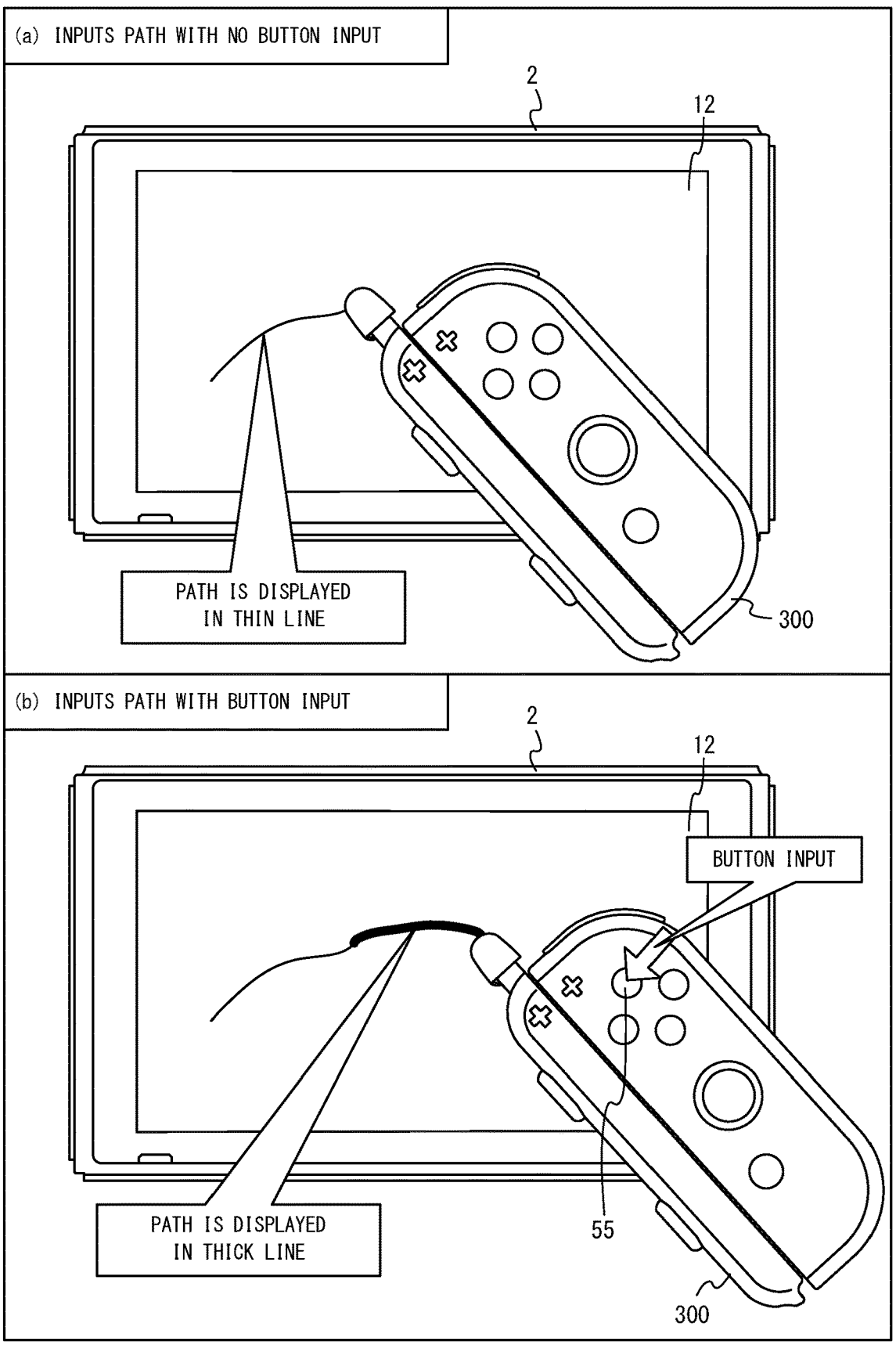
FIG. 26 shows an example game operation in a non-limiting second game process.

Referring to FIG. 26 and FIG. 27, a second game process will be described. In the second game process, the main body apparatus 2 executes an information process based on a combination of a touch input that is being made using the touch-pen-attached controller device and an input that is being made on the touch-pen-attached controller device. The details of the first game process will now be described.

FIG. 26 shows an example game operation in the second game process. As shown in FIG. 26, in the second game process, the path of the touch input (specifically, the path of touch positions of a continuous touch input) is displayed on the display 12.

As shown in FIG. 26(*a*), when a touch input is made with no input being made on a predetermined button (herein, the X button 55) of a controller included in the touch-pen-attached controller device 300 (the right controller 4 in the example illustrated in FIG. 24), the path of the touch input is displayed in a thin line. On the other hand, as shown in FIG. 26(*b*), when a touch input is made with an input being made on the predetermined button, the path of the touch input is displayed in a thick line.

As described above, in the second game process, depending on the content of the input being made on the controller to which the touch pen attachment 140 is attached, the content of the information process (specifically, the process of displaying the path) that is performed in accordance with the touch input varies. Then, a user can give an instruction to change the content (specifically, the thickness of the path to be displayed) of the information process performed in accordance with the touch input by using a hand with which the user is holding the touch-pen-attached controller device 300, and it is therefore easy to give such an instruction. Thus, according to the exemplary embodiment, it is possible to improve the controllability for touch inputs.

FIG. 27 is a flow chart showing an example flow of the second game process executed by the game system 1. Note that a series of game processes shown in FIG. 27 are started in response to the start of a game program for executing the second game process.

In step S11, the processor 81 displays a game image on the display 12. In the second game process, the processor 81 generates a game image including an area where the path of a touch input is displayed (e.g., a virtual canvas), and displays the game image on the display 12. The process of step S12 is executed, following step S11.

In step S12, the processor 81 accepts an input by a user. The process of step S12 is the same as the process of step S2 in the first game process. The process of step S13 is executed, following step S12.

In step S13, based on the data obtained in step S12, the processor 81 determines whether or not a touch input has been made on the touch panel 13. When the determination result of step S13 is affirmative, the process of step S14 is executed. On the other hand, when the determination result of step S13 is negative, the process of step S17 to be described below is executed.

In step S14, the processor 81 determines whether or not an input is being made on the predetermined button of the controller included in the touch-pen-attached controller device 300 based on the data obtained in step S12. Note that in the second game process, the controller for which the determination of step S14 is made (i.e., the controller to which the touch pen attachment 140 is attached) is pre-identified by the main body apparatus 2. The method by which the controller is identified is similar to that in the first game process described above. When the determination result of step S14 is negative, the process of step S15 is executed. On the other hand, when the determination result of step S14 is affirmative, the process of step S16 is executed.

In step S15, the processor 81 displays, in a line of a first thickness on the display 12, the path of a touch input that is made using the touch-pen-attached controller device 300. Specifically, the processor 81 generates an image of a line of the first thickness that represents the path from a touch position that is identified in step S15 or S16 of the preceding iteration to a touch position that is identified in step S15 of the current iteration, and displays the image on the display 12. The process of step S17 is executed, following step S15.

In step S16, the processor 81 displays, in a line of a second thickness that is greater than the first thickness on the display 12, the path of a touch input that is made using the touch-pen-attached controller device 300. Specifically, the processor 81 generates an image of a line of the second thickness that represents the path from a touch position that is identified in step S15 or S16 of the preceding iteration to a touch position that is identified in step S16 of the current iteration, and displays the image on the display 12. The process of step S17 is executed, following step S16.

In step S17, the processor 81 determines whether or not to end the game process. For example, when an instruction to end the game is given by a user, the processor 81 determines to end the game process. When the determination result of step S17 is negative, the process of step S12 described above is executed again. The series of processes of steps S12 to S17 described above are executed repeatedly until the result of the determination process of step S17 is affirmative. On the other hand, when the determination result of step S17 is affirmative, the processor 81 ends the second game process.

As described above, in the second game process, the main body apparatus 2 includes an information processing section (specifically, the processor 81) that executes an information process based on an input that is made on the touch panel 13 using the touch pen portion 200 and on input information of an input that is made on an input section of the controller to which the touch pen attachment 140 is attached. Then, it is possible to give a wider variety of instructions through touch inputs using the touch pen attachment 140, and it is therefore possible to improve the convenience of the touch input. Moreover, a user can make a touch input and an input that is made on a controller both using one hand, and it is therefore possible to improve the controllability for touch inputs.

While "an input section of a controller" as described above is a button in the exemplary embodiment, it may be any input section. For example, in other embodiments, "an input section of a controller" may be an analog stick or an inertia sensor. For example, the main body apparatus 2 may change the thickness of the line representing the path of a touch input displayed on the display 12 in accordance with the direction that is input using an analog stick. For example, based on the output of the angular velocity sensor 115, the main body apparatus 2 may calculate the attitude of the controller (in other words, the touch-pen-attached controller device 300) in the period in which a touch input is made so as to change the thickness of the line representing the path of the touch input in accordance with the attitude. For example, based on the output of the acceleration sensor 114, the main body apparatus 2 may determine whether or not a swing operation has been performed using the controller (in other words, the touch-pen-attached controller device 300) so as to change the thickness of the line representing the path of the touch input in accordance with whether or not a swing operation has been performed.

While the information process is a process of displaying the path of a touch input on the display 12 in the exemplary embodiment, it may be any information process. For example, in other embodiments, the information process may be a process executed on an object that has been specified by a touch input. Specifically, as the information process, the main body apparatus 2 may execute a process of performing an action on an object that has been specified by a touch input, wherein the action varies between when a predetermined input is being made on the controller and when the predetermined input is not being made on the controller.

To "execute an information process based on an input that is made on the touch panel and on input information of an input that is made on an input section of the controller" means to include embodiments in which the information process is executed or not executed based on the presence/absence of an input that is made on the touch panel or on the presence/absence of an input that is made on an input section of the controller. For example, to "not execute an information process when there is no input made on the controller, and execute an information process in accordance with an input that is made on the touch panel when there is an input made on the controller" falls under the meaning of "executing an information process based on an input that is made on the touch panel and on input information of an input that is made on an input section of the controller".

[5. Functions/Effects and Variations of Exemplary Embodiment]

In the embodiment described above, the touch pen attachment 140 can be attached to a game controller (specifically, the left controller 3 or the right controller 4) including a controller-side slide portion (specifically, a slider). The touch pen attachment 140 includes the following elements:

the housing 141;

an attachment-side slide portion (specifically, the rail member 143) capable of engaging with a controller-side slide portion so that the attachment-side slide portion can slide in a predetermined slide direction, wherein the attachment-side slide portion has a first side and a second side with respect to the slide direction, and a controller-side slide portion can be inserted into the attachment-side slide portion from the first side (specifically, the y-axis negative direction side);

a stopper portion 144 on the second side (specifically, the y-axis positive direction side) relative to a center of the attachment-side slide portion, wherein the stopper portion 144 stops a slide movement, in an insertion direction, of the controller-side slide portion that has been inserted from the first side of the attachment-side slide portion; and a touch pen portion 200.

According to the description above, it is possible to add a touch pen function to the game controller by attaching the touch pen attachment 140, which includes the touch pen portion 200, to the game controller. With this touch-pen-attached game controller, a user can make an input using an input section of the game controller, and make a touch input using the touch pen. Thus, according to the exemplary embodiment, it is possible to expand the functionality of the touch pen.

Note that in the exemplary embodiment, the touch pen portion 200 is provided at an end portion of the housing on the second side (specifically, the y-axis positive direction side) in the slide direction) (FIG. 1). Herein, when the touch pen attachment 140 is attached to the game controller, the game controller is inserted from the first side of the attachment-side slide portion (FIG. 20). Therefore, by providing the touch pen portion 200 on the opposite side from the first side, the touch pen portion 200 is unlikely to interfere with the attachment operation. That is, the touch pen attachment 140 can be easily attached to the game controller. When a touch input is made by using the touch pen attachment 140 while attached to the game controller, a force acts in the direction in which the controller-side slide member pushes the stopper portion 144, and it is therefore possible to reduce the possibility that the touch pen attachment 140 slips on the game controller or comes off the game controller. Thus, it is possible to improve the controllability for touch inputs.

Note that in other embodiments, the touch pen portion 200 may be provided on at least one of an end portion of the housing on the first side in the slide direction and another end portion thereof on the second side in the slide direction. As in the exemplary embodiment, this also makes it possible to expand the functionality of the touch pen.

In the exemplary embodiment, the touch pen portion 200 includes the pen point 202, which is conductive, so that it can be used on a capacitive touch panel. Herein, in other embodiments, the touch pen attachment 140 may be usable on a touch panel of any other type (e.g., a pressure-sensitive type). In such a case, the pen point does not need to be made of a conductive substance.

The exemplary embodiment employs a configuration in which the metal rail member 143 is electrically connected to the conductive pen point 202, thereby increasing the capacitance of the pen point 202. Herein, in other embodiments, other configurations may be employed for increasing the capacitance of the pen point 202. For example, in other embodiments, a conductive substance (e.g., a metal foil or a conductive rubber) may be provided on a portion of the surface of the housing 141 so that the substance and the pen point 202 are electrically connected together. Note that the portion where the conductive substance is provided may be a portion that is likely to be contacted by a hand of a user who makes a touch input (e.g., the front surface and/or the rear surface provided between the engaging surface and the button provision surface). Also with such a configuration, it is possible to increase the capacitance of the pen point 202.

As described above, in other embodiments, the housing 141 may be provided with the attachment-side slide portion, and at least a portion of the surface thereof may include a conductive substance. Then, the connecting portion may be a conductive substance that connects the pen point 202 with the above-described portion of the housing 141.

In the embodiment described above, the touch pen attachment 140 is an attachment attachable to a game controller (e.g., the right controller 4) having a controller-side slide portion (e.g., the slider 130) that includes a controller-side first operation button (e.g., the second L button 65) and a controller-side second operation button (e.g., the second R button 66). The touch pen attachment 140 includes the following elements:

a strap;

an attachment-side slide portion (e.g., the rail member 143) on a first surface (e.g., the engaging surface) of the attachment, the attachment-side slide portion having a first side of a center of the attachment-side slide portion and a second side of a center of the attachment-side slide portion opposite to each other in a predetermined slide direction (e.g., the y-axis direction shown in FIG. 14), wherein the attachment-side slide portion is configured to slidably engage with a controller-side slide portion in the slide direction, and wherein the controller-side slide portion is insertable into the attachment-side slide portion from the first side (e.g., the y-axis negative direction side shown in FIG. 14);

a stopper portion (e.g., the stopper portion 144 shown in FIG. 15) on the second side (e.g., the y-axis positive direction side shown in FIG. 14) of the center of the attachment-side slide portion and configured to limit the slide movement, in an insertion direction, of the controller-side slide portion which has been inserted from the first side of the attachment-side slide portion;

a lock portion (e.g., the projection and/or the contact surfaces 631a and 631b) configured to resist the slide movement, in a removal direction opposite to the insertion direction, while the slide movement of the controller-side slide portion is substantially limited by the stopper portion;

an attachment-side first operation button (e.g., the first button 151) on a second surface on a reverse side from the first surface (e.g., the button provision surface); and an attachment-side second operation button (e.g., the second button 152) on the second surface.

The attachment-side first operation button includes a first actuation portion (e.g., the first actuation portion 151a shown in FIG. 15) configured to protrude from the first surface, thereby pressing a game controller-side first operation button, in response to an operation of pressing the attachment-side first operation button. The attachment-side second operation button includes a second actuation portion (e.g., the second actuation portion 152a shown in FIG. 15) configured to protrude from the first surface, thereby pressing a game controller-side second operation button, in response to an operation of pressing the attachment-side second operation button.

As described above, with the slide portion of the attachment and the slide portion of the game controller engaged with each other, a user can easily detach the attachment from the game controller. That is, it is possible to easily detach the touch pen attachment from the game controller.

The term "slide member" may refer to the rail member or the slider as used in the embodiment described above. Note that in the embodiment described above, a slide member provided on the touch pen attachment 140 and a slide member provided on the controller are referred to as a "rail member" and a "slider", respectively, so that these members can easily be distinguished from each other. The shape of the rail member and that of the slider are not limited to those of the embodiment described above. For example, a slide member having a cross section shaped as shown in FIG. 17 may be referred to as a "slider", and a slide member having a T-shaped cross section as shown in FIG. 13 may be referred to as a "rail member".

Note that in the embodiment described above, the rail member, which is an example slide member, is provided on the engaging surface of the housing 141, and is configured to have the bottom surface portion, the side surface portion and the opposing portion. In other embodiments, the housing and the rail member (in other words, the slide member) may be configured as follows. That is, the touch pen attachment 140 may include a member A (e.g., the first member 141a described above) forming a part of the housing and including an opening, and a member B (e.g., the rail member 143 described above) including the bottom surface portion, the side surface portion and the opposing portion. Then, the bottom surface portion of the member B is connected to the member A so as to cover at least a portion of the opening of the member A. With such a configuration, the surface of the bottom surface portion of the member B corresponds to the "first surface" described above, and the side surface portion and the opposing portion of the member B correspond to the "rail member" described above. Thus, the rail member may not have the bottom surface portion. For example, the touch pen attachment 140 may be configured so that the rail member includes the side surface portion and the opposing portion (while not including the bottom surface portion), wherein the side surface portion is connected to the engaging surface of the housing.

According to the above description, since the attachment includes the actuation portion, a user can operate operation buttons on the game controller by pressing the operation buttons provided on the attachment even if the attachment is attached to the game controller.

According to the above description, since the attachment includes the lock portion, it is possible to reduce the possibility that the attachment comes off the game controller as a result of the controller-side slide portion, which has been inserted into the attachment-side slide portion, moving in the removal direction.

Note that "resisting (the slide movement)" as used herein means limiting (in other words, generally preventing) the slide movement through engagement between one member and another member. Note however that "resisting (the slide movement)" means to prevent the slide movement with a force less than a certain level, and means that the slide movement may be allowed when a force greater than a certain level is applied (thereby releasing the engagement).

In the embodiment described above, the game controller includes the projection (e.g., the projection 133 shown in FIG. 7). In the embodiment described above, it can be said that the contact surfaces 631a and 631b of the opposing portion 163 are serving as the lock portion described above.

That is, the lock portion is on the second side (e.g., the y-axis positive direction side shown in FIG. 14) of the center of the attachment-side slide portion, and has a shape (see FIG. 19) configured to engage with a projection on the game controller (see FIG. 20) while the slide movement of the controller-side slide portion is substantially limited by the stopper portion.

Then, when the attachment is attached to the game controller including the projection, the slide movement can be generally prevented, thus reducing the possibility that the attachment comes off the game controller.

In the embodiment described above, the attachment-side slide portion includes a bottom surface (e.g., the bottom surface 161a shown in FIG. 17) substantially parallel to the slide direction, two side surfaces (e.g., the side surfaces of the side surface portion 162 shown in FIG. 17) each being substantially parallel to the slide direction and extending from the opposite sides of the bottom surface, and two opposing portions (e.g., the opposing portion 163 shown in FIG. 17) extending from the two side surfaces, respectively, and each having a surface opposing the bottom surface. The lock portion is part of each of the two opposing portions (see FIG. 19).

According to the above description, with the attachment attached to the game controller, the projection engages with the lock portion whether the projection of the game controller is provided on the side of one opposing portion or on the side of the other opposing portion. This allows the attachment to be used with a wider variety of game controllers.

In the embodiment described above, it can be said that the projection described above of the touch pen attachment 140 serves as the lock portion. That is, the lock portion includes a projection provided on the first side (e.g., the y-axis negative direction side shown in FIG. 14) of the center of the attachment-side slide portion, and the projection can engage with the controller-side slide portion while the slide movement is substantially limited by the stopper portion.

Then, when the attachment is attached to the game controller, it is possible with the projection described above to generally prevent the slide movement, thereby reducing the possibility of the attachment coming off the game controller.

As described above, in the embodiment described above, the contact surfaces 631a and 631b of the opposing portion 163 and the projection both serve as the lock portion. Note that in other embodiments, the touch pen attachment 140 may include only one of the contact surfaces and the projection as the lock portion.

It can be said that the touch pen attachment 140 of the embodiment described above is an attachment attachable to a game controller (e.g., the right controller 4) having a controller-side slide portion (e.g., the slider 130). The touch pen attachment 140 includes the following elements:

an attachment-side slide portion (e.g., the rail member 143) on a first surface (e.g., the engaging surface) of the attachment, the attachment-side slide portion having a first side of a center of the attachment-side slide portion and a second side of the center of the attachment-side slide portion opposite to each other in a predetermined slide direction (e.g., the y-axis direction shown in FIG. 14), wherein the attachment-side slide portion is configured to slidably engage with a controller-side slide portion in the slide direction, and wherein the controller-side slide portion is insertable into the attachment-side slide portion from the first side (e.g., the y-axis negative direction side shown in FIG. 14);

a stopper portion (e.g., the stopper portion 144 shown in FIG. 15) on the second side of the center of the attachment-side slide portion and configured to limit the slide movement, in an insertion direction, of the controller-side slide portion which has been inserted from the first side of the attachment-side slide portion; and a strap anchor (e.g., the shaft portion 141h shown in FIG. 15) to which a strap can be fastened, wherein the strap anchor is on a portion of the attachment which portion is on the same side of the center of the attachment in the slide direction as the first side.

Then, by engaging the slide portion of the attachment with the slide portion of the game controller, a user can easily detach the attachment (including the strap) from the game controller. If a strap is fastened to the strap anchor of the attachment, a user can detach the attachment from the controller, thereby removing the strap from the controller, without having to remove the strap from the attachment. That is, it is possible to easily detach the strap from the game controller.

(Variation Regarding Projection)

In the embodiment described above, the projection 49 for generally preventing the slide movement of the controller in the removal direction is biased into the first position (in other words, the protruding state). In other embodiments, the projection 49 may be configured so that the projection 149 can be switched between a state (called the "locked state") in which the movement from the first position to the second position is limited and another state (called the "unlocked state") in which the movement from the first position to the second position is allowed by means of an operation section (an operation lever to be described later) that can be operated by a user. A variation regarding the projection 149 will now be described.

Figure 28:
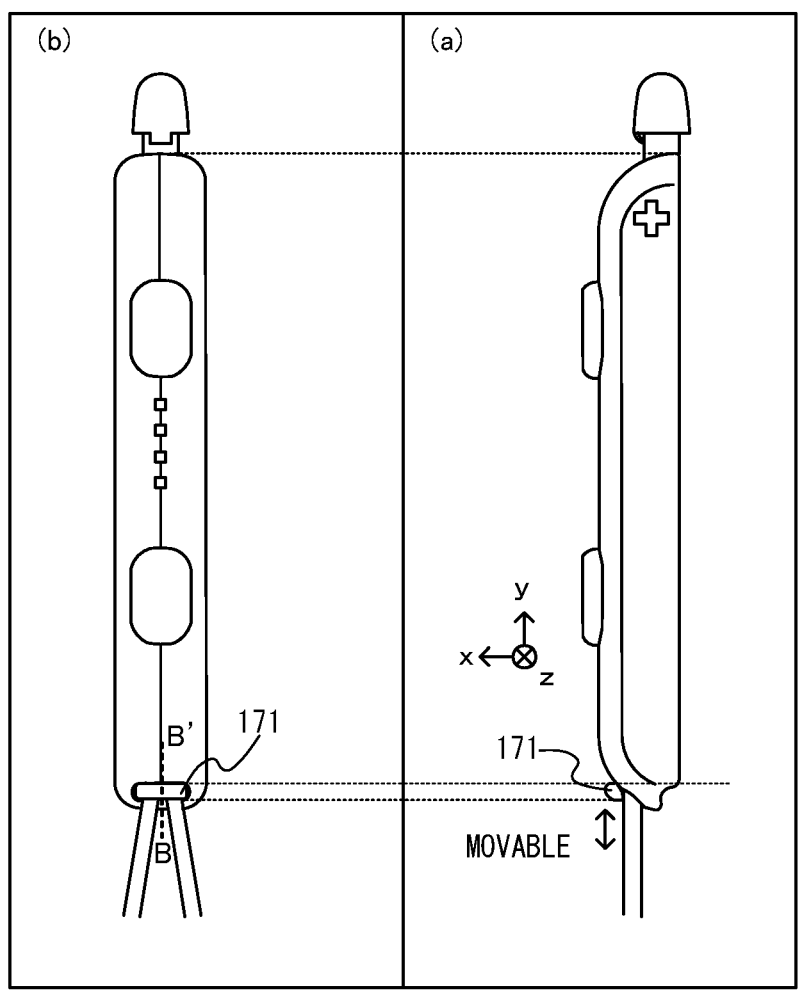
FIG. 28 shows a non-limiting example touch pen attachment according to a variation.
Figure 29:
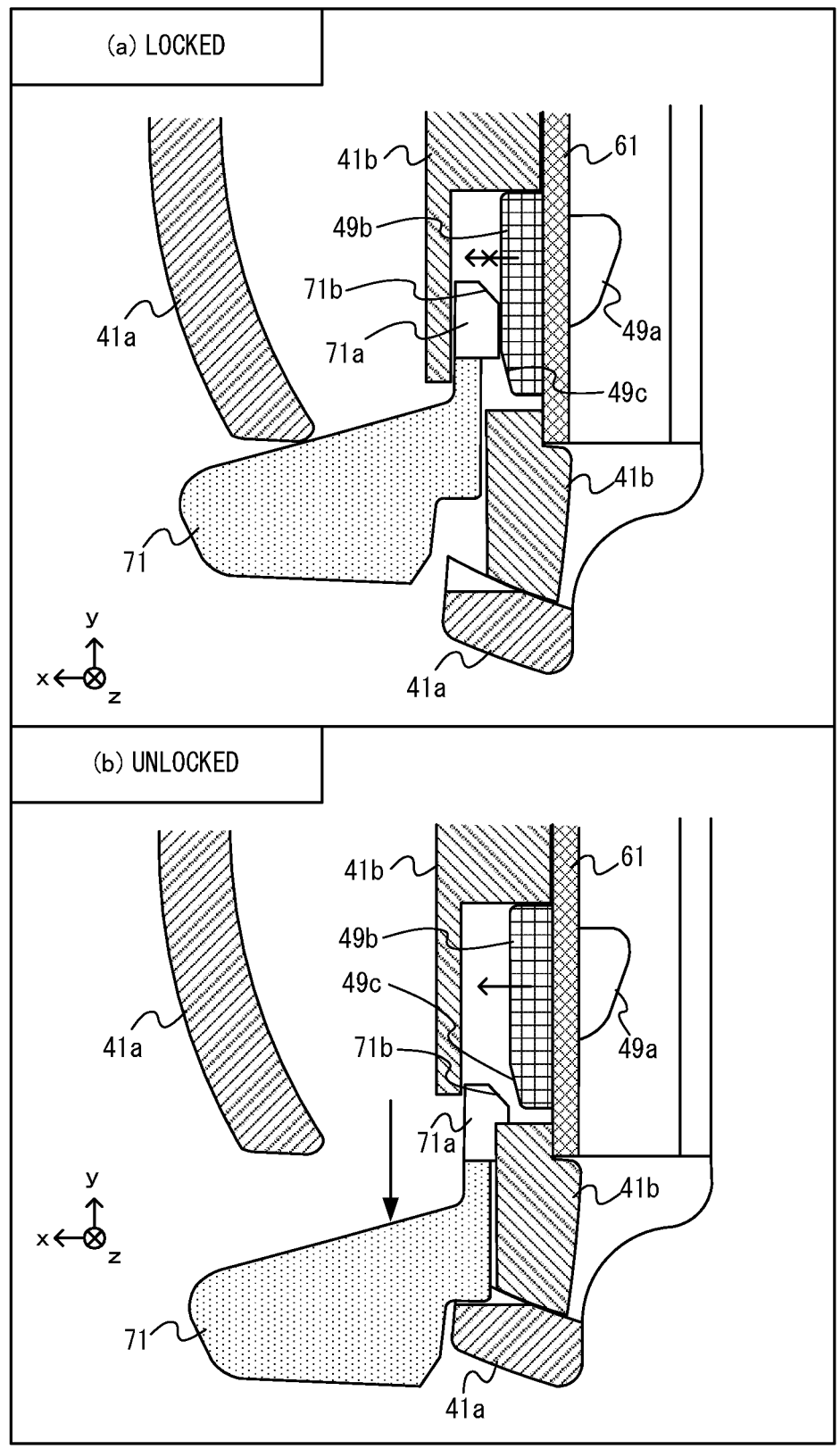
FIG. 29 is a cross-sectional view taken along line B-B' of FIG. 28.

FIG. 28 shows an example touch pen attachment according to a variation of the embodiment described above. FIG. 28 shows a front view (FIG. 28(a)) and a left side view (FIG. 28(b)) of the touch pen attachment. FIG. 29 is a cross-sectional view taken along line B-B' of FIG. 28. Note that in order to facilitate understanding of elements of interest to be discussed, FIG. 29 does not show some elements (e.g., the strap 147) of the touch pen attachment 140.

As shown in FIG. 28, in this variation, the touch pen attachment 140 includes an operation lever 171. The operation lever 171 is supported on the housing 141 so that the operation lever 171 can be moved by an operation by a user. In this variation, the operation lever 171 is provided so that the operation lever 171 can move in the up-down direction (i.e., the y-axis direction). More specifically, the operation lever 171 is movable between the upper position (i.e., the position shown in FIG. 29(a)) and the lower position (i.e., the position shown in FIG. 29(b)).

As described above, in this variation, the operation lever 171 is movable in a direction (i.e., the y-axis direction) that is different from the direction of movement of the buttons 151 and 152 (i.e., the x-axis direction). More specifically, the direction of movement of the operation lever 171 is substantially perpendicular to the direction of movement of the buttons. Thus, it is possible to reduce the possibility of the operation lever 171 being moved (thereby causing the touch pen attachment 140 to come off the controller, the details of which will be described later) when a user inadvertently touches the operation lever 171 while pressing down a button.

As shown in FIG. 28, the operation lever 171 is provided in the lower end portion of the touch pen attachment 140, i.e., in the vicinity of the area where the projection 149 is provided. Note that the strap 147 is provided in the vicinity of the operation lever 171. Therefore, although not shown in the figure, the operation lever 171 has a shape such that it does not interfere with the strap 147 (e.g., a shape with a hole through which the strap 147 can pass). Note that there is no particular limitation on the specific shape and material of the operation lever 171.

As shown in FIG. 29, the operation lever 171 includes a contact portion 171a. The contact portion 171a is provided inside the housing 141 (more specifically, in the vicinity of the reverse side of the substrate 149b of the projection 149). As shown in FIG. 29(a), when the operation lever 171 is in the upper position, the contact portion 171a is in contact with the reverse side surface of the substrate 149b of the projection 149. When the operation lever 171 is in the upper position, the contact portion 171a is sandwiched between the substrate 149b and the housing 141 (specifically, the second member 141b). In such a position, the projection 149 is in the locked state, and the movement from the first position to the second position is limited by the contact portion 171a (see an arrow shown in FIG. 29(a)). That is, while the operation lever 171 is in the upper position, the projection 149 remains in the first position.

Note that when the operation lever 171 is in the upper position, the contact portion 171a is pressed by the substrate 149b and the second member 141b. Thus, the operation lever 171 cannot be moved unless a force greater than a certain level is applied thereto. For example, the operation lever 171 in the upper position does not move to the lower position by virtue of its own weight. Moreover, the direction in which the projection 149 can be moved is substantially perpendicular to the direction in which the operation lever 171 (specifically, the contact portion 171a) can be moved. Therefore, even if a force is applied to the projection 149 urging the projection 149 to move from the first position to the second position (e.g., by a force urging the slider of the controller in the attached state to move in the removal direction), it is difficult for the operation lever 171 to move from the upper position to the lower position.

On the other hand, as shown in FIG. 29(b), when the operation lever 171 is in the lower position, the contact portion 171a retracts from the gap between the substrate 149b of the projection 149 in the first position and the second member 141b of the housing 141. Therefore, in this state, the projection 149 is in the unlocked state and is allowed to move from the first position to the second position. Note that in this variation, the spring 150 is absent on the reverse side of the substrate 149b.

In this variation, as shown in FIG. 29, the contact portion 171a has a slope 171b on the upper side (the y-axis positive direction side; in other words, the side of the end portion along the direction from the lower position to the upper position). That is, the upper end portion of the contact portion 171a is tapered away from the substrate 149b in the upward direction. As shown in FIG. 29, the substrate 149b has a slope 149c on the lower side (the y-axis negative direction side; in other words, the side of the end portion along the direction from the upper position to the lower position of the contact portion 171a). That is, the lower end portion of the substrate 149b is tapered away from the contact portion 171a in the downward direction. With these slopes 171b and 149c, the contact portion 171a is unlikely interfered by the substrate 149b while moving from the lower position to the upper position, realizing smooth movement. Note that in other embodiments, only one of the contact portion 171a and the substrate 149b may be provided with a slope. This also realizes similar effects to those of this variation. Note that in other embodiments, the contact portion 171a and the substrate 149b may be configured with no slope.

With the configuration of this variation, a user can switch the projection 149 between the locked state and the unlocked state by operating the position of the operation lever 171. That is, in the attached state, a user can set the operation lever 171 in the upper position to lock the projection 149, thereby generally preventing the slide movement of the slider in the removal direction by means of the projection 149. In the attached state, a user can set the operation lever 171 in the lower position to unlock the projection 149, thereby lifting the prohibition of the slide movement by the projection 149.

In this variation, when the touch pen attachment 140 is attached to the controller, a user sets the operation lever 171 in the lower position, and inserts the slider of the controller into the rail member 143 of the touch pen attachment 140. Note that also in this variation, as in the embodiment described above, the projecting member 149a may be provided with a slope so that the slider 130 is less likely to be interfered by the projecting member 149a.

After the slider of the controller is inserted into the rail member 143 of the touch pen attachment 140 to achieve the attached state, a user moves the operation lever 171 to the upper position. This locks the projection 149, thereby generally preventing the slide movement of the slider in the removal direction. A user leaves the operation lever 171 in the upper position while using the touch-pen-attached controller device.

In order to detach the touch pen attachment 140 from the controller, a user moves the operation lever 171 to the lower position. This unlocks the projection 149, thereby lifting the prohibition of the slide movement by the projection 149, allowing a user to easily detach the touch pen attachment 140 from the controller.

As described above, in this variation, the touch pen attachment 140 includes an operation section (e.g., the operation lever 171) movable between the third position (e.g., the upper position) and the forth position (e.g., the lower position) through an operation by a user. The operation section in the third position limits the movement of the projection 149 from the first position to the second position (FIG. 29(a)), and the operation section in the fourth position allows the projection 149 to move from the first position to the second position (FIG. 29(b)).

Then, by operating the position of the operation section, a user can switch between a state (e.g., the locked state described above) in which the projection can generally prevent the slide movement of the slide portion in the insertion direction and another state (e.g., the unlocked state described above) in which the projection does not generally prevent (or does not substantially prevent) the slide movement.

In the variation described above, the direction of movement of the projection 149 from the first position to the second position is substantially perpendicular to the direction of movement of the operation lever 171 from the third position to the fourth position (FIG. 29). The operation lever 171 in the third position is in contact with the projection 149 in the first position, thereby limiting the movement of the projection 149 from the first position to the second position. The operation lever 171 in the fourth position is not in contact with the projection 149 in the first position.

Then, it is possible to reduce the possibility of the operation lever 71 moving from the third position to the fourth position even if a force is applied to the projection 49 urging the projection 49 to move from the first position to the second position. Then, it is possible to reduce the possibility of the touch pen attachment 140 coming off the controller as a result of the operation lever 171 inadvertently moving from the third position to the fourth position against user's intention.

As described above, the embodiment described above is applicable to a touch pen attachment that can be attached to a game controller, for example, with the aim of, for example, expanding the functionality of a touch pen.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A touch pen attachment which is attachable to a game controller including a controller-side slide portion, comprising:
   a housing;
   an attachment-side slide portion configured to slidably engage with the controller-side slide portion in a slide direction, wherein the attachment-side slide portion has a first side and a second side with respect to the slide direction, and the controller-side slide portion is insertable into the attachment-side slide portion from the first side;
   a stopper on the second side of a center of the attachment-side slide portion and configured to stop a slide movement, in an insertion direction, of the controller-side slide portion that has been inserted from the first side of the attachment-side slide portion;
   a touch pen on at least one of an end portion of the housing on the first side in the slide direction and another end portion thereof on the second side in the slide direction; and
   at least a first operation button and a second operation button each disposed on a side of the housing that opposes the attachment-side slide portion, wherein the first operation button and the second operation button are configured to receive a user input for controlling a game operation in a case that the touch pen attachment is slidably engaged with the game controller.

2. A touch pen attachment which is attachable to a game controller including a controller-side slide portion, comprising:
   a housing;
   an attachment-side slide portion configured to slidably engage with the controller-side slide portion in a slide direction, wherein the attachment-side slide portion has a first side and a second side with respect to the slide direction, and the controller-side slide portion is insertable into the attachment-side slide portion from the first side;
   a stopper on the second side of a center of the attachment-side slide portion and configured to stop a slide movement, in an insertion direction, of the controller-side slide portion that has been inserted from the first side of the attachment-side slide portion;
   a touch pen on at least one of an end portion of the housing on the first side in the slide direction and another end portion thereof on the second side in the slide direction, wherein
   the touch pen includes a conductive pen point;

the attachment-side slide portion is conductive; and
the touch pen attachment further includes a conductive connecting portion that connects together the pen point and the attachment-side slide portion.

3. The touch pen attachment according to claim 2, wherein the attachment-side slide portion is made of a metal.

4. The touch pen attachment according to claim 1, wherein the touch pen is on the end portion of the housing on the second side in the slide direction.

5. The touch pen attachment according to claim 4, wherein the touch pen protrudes from an end portion of the attachment-side slide portion on the second side in a direction from the first side toward the second side.

6. A controller system comprising a game controller and a touch pen attachment which is attachable to the game controller, wherein:
the game controller comprises a controller-side slide portion; and
the touch pen attachment comprises
a housing;
an attachment-side slide portion configured to slidably engage with the controller-side slide portion in a slide direction, wherein the attachment-side slide portion has a first side and a second side with respect to the slide direction, and the controller-side slide portion is insertable into the attachment-side slide portion from the first side;
a stopper on the second side of a center of the attachment-side slide portion and configured to stop a slide movement, in an insertion direction, of the controller-side slide portion that has been inserted from the first side of the attachment-side slide portion;
a touch pen on at least one of an end portion of the housing on the first side in the slide direction and another end portion thereof on the second side in the slide direction; and
at least a first operation button and a second operation button each disposed on a side of the housing that opposes the attachment-side slide portion, wherein
the first operation button and the second operation button are configured to receive a user input for controlling a game operation in a case that the touch pen attachment is slidably engaged with the game controller.

7. A game system comprising a game apparatus, a game controller capable of communicating with the game apparatus; and a touch pen attachment which is attachable to the game controller, wherein:
the game apparatus comprises a touch panel;
the game controller comprises a controller-side slide portion; and
the touch pen attachment comprises
a housing;
an attachment-side slide portion configured to slidably engage with the controller-side slide portion in a slide direction, wherein the attachment-side slide portion has a first side and a second side with respect to the slide direction, and the controller-side slide portion is insertable into the attachment-side slide portion from the first side;
a stopper on the second side of a center of the attachment-side slide portion and configured to stop a slide movement, in an insertion direction, of the controller-side slide portion that has been inserted from the first side of the attachment-side slide portion; and
a touch pen on at least one of an end portion of the housing on the first side in the slide direction and another end portion thereof on the second side in the slide direction, wherein
the game apparatus is configured to
detect a touch input by the touch pen attachment to the touch panel of game apparatus in a case that the touch pen attachment is slidably engaged with the game controller; and
wirelessly transmit an instruction to the game controller based on the touch input by the touch pen attachment detected at the touch panel in a case that the touch pen attachment is slidably engaged with the game controller.

8. The game system according to claim 7, wherein
the game apparatus includes a communication interface configured to transmit a vibration instruction to the game controller based on an input made on the touch panel using the touch pen.

9. The game system according to claim 7, wherein
the game controller includes a user interface, and
the communication interface of the game controller is configured to transmit, to the game apparatus, information corresponding to an input received at the user interface.

10. The game system according to claim 8, wherein the game controller comprises:
a vibrator; and
processing circuitry configured to cause the vibrator to vibrate in a case that the vibration instruction is received from the game apparatus.

11. The game system according to claim 9, wherein the game apparatus comprises:
a communication interface configured to receive the information corresponding to the input received at the user interface transmitted by communication interface of the game controller; and
processing circuitry configured to execute a process based on an input received at the touch panel using the touch pen and the information corresponding to the input received at the user interface.

12. The touch pen attachment according to claim 1, wherein
the first operation button and the second operation button each protrude from the side of the housing that opposes the attachment-side slide portion.

13. The touch pen attachment according to claim 12, further comprising:
a first spring configured to bias the first operation button away from the housing; and
a second spring configured to bias the second operation button away from the housing.

14. The touch pen attachment according to claim 13, wherein
the first operation button includes a first protruding portion that extends through a first opening of the attachment-side slide portion and makes contact with a first button of the game controller in a case that the touch pen attachment is slidably engaged with the game controller and a user input is received at the first operation button, and
the second operation button includes a second protruding portion that extends through a second opening of the attachment-side slide portion and makes contact with a second button of the game controller in a case that the touch pen attachment is slidably engaged with the game controller and a user input is received at the second operation button.

15. The touch pen attachment according to claim 1, wherein the touch pen includes a conductive connecting portion that connects the touch pen to the attachment-side slide portion.

16. The touch pen attachment according to claim 15, wherein the connecting portion includes a projection configured to protrude through an opening of the attachment-side slide portion.

17. The touch pen attachment according to claim 1, wherein the touch pen includes a connecting portion configured to connect the touch pen to the attachment-side slide portion through an opening formed in the housing in proximity to the stopper.

* * * * *